US011540021B2

(12) United States Patent
Hogan et al.

(10) Patent No.: US 11,540,021 B2
(45) **Date of Patent: *Dec. 27, 2022**

(54) SYSTEMS AND METHODS FOR CREATING AND NAVIGATING BROADCAST-READY SOCIAL CONTENT ITEMS IN A LIVE PRODUCED VIDEO

(71) Applicant: Tagboard, Inc., Redmond, WA (US)

(72) Inventors: Jennifer Hogan, Renton, WA (US); David Peter McLauchlan, Kirkland, WA (US)

(73) Assignee: Tagboard, Inc., Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/164,555

(22) Filed: Feb. 1, 2021

(65) Prior Publication Data

US 2021/0297745 A1 Sep. 23, 2021

Related U.S. Application Data

(60) Continuation of application No. 16/422,843, filed on May 24, 2019, now Pat. No. 10,911,830, which is a (Continued)

(51) Int. Cl.
*H04N 5/445* (2011.01)
*H04N 21/472* (2011.01)
(Continued)

(52) U.S. Cl.
CPC ..... *H04N 21/47205* (2013.01); *G06F 16/735* (2019.01); *G06Q 50/01* (2013.01); (Continued)

(58) Field of Classification Search
CPC ......... H04N 21/47205; H04N 21/2187; H04N 21/26258; H04N 21/27; H04N 21/4126; H04N 21/4788; H04N 21/8146; H04N 21/854; G06F 16/735; G06Q 50/01; H04H 60/07
See application file for complete search history.

(56) References Cited

U.S. PATENT DOCUMENTS

2013/0014223 A1* 1/2013 Bhatia ................ H04N 21/2668 726/4
2013/0073979 A1* 3/2013 Shepherd .............. G06Q 50/01 715/744

(Continued)

*Primary Examiner* — Annan Q Shang
(74) *Attorney, Agent, or Firm* — Perkins Coie LLP

(57) ABSTRACT

Systems and methods for incorporating social content items into a produced video are provided. The system presents a producer interface to a user that allows the user to query for social content items. The user may then select and arrange social content items in an on-air queue. In an on-air mode, the system generates a broadcast-ready on-air format of the social content items and provides a video stream including the broadcast-ready social content items in the on-air queue to a video production system. The broadcast-ready social content items are incorporated into a produced video by the video production system. The user may navigate through the social content items in the on-air queue while on camera as part of the produced video.

20 Claims, 19 Drawing Sheets

Social Media Platform(s) 102
100
Network 90
104
Video Production System 84
80
Video Camera 82
89
86
87
88

Related U.S. Application Data division of application No. 14/465,667, filed on Aug. 21, 2014, now Pat. No. 10,349,140.

(60) Provisional application No. 61/905,598, filed on Nov. 18, 2013.

(51) Int. Cl.

| | |
|---|---|
| ***H04N 21/81*** | (2011.01) |
| ***H04N 21/4788*** | (2011.01) |
| ***H04N 21/41*** | (2011.01) |
| ***G06Q 50/00*** | (2012.01) |
| ***H04N 21/2187*** | (2011.01) |
| ***H04N 21/262*** | (2011.01) |
| ***H04N 21/27*** | (2011.01) |
| ***H04N 21/854*** | (2011.01) |
| ***H04H 60/07*** | (2008.01) |
| ***G06F 16/735*** | (2019.01) |

(52) U.S. Cl.

CPC ........ *H04H 60/07* (2013.01); *H04N 21/2187* (2013.01); *H04N 21/26258* (2013.01); *H04N 21/27* (2013.01); *H04N 21/4126* (2013.01); *H04N 21/4788* (2013.01); *H04N 21/8146* (2013.01); *H04N 21/854* (2013.01)

(56) References Cited

U.S. PATENT DOCUMENTS

| | | | | | |
|---|---|---|---|---|---|
| 2013/0226758 | A1* | 8/2013 | Reitan | G06Q 30/02 | 705/35 |
| 2014/0123160 | A1* | 5/2014 | van Coppenolle | H04N 21/234318 | 725/25 |
| 2014/0123161 | A1* | 5/2014 | van Coppenolle | H04L 65/611 | 725/8 |
| 2014/0223329 | A1* | 8/2014 | Falaki | G06Q 50/01 | 715/747 |
| 2016/0191964 | A1* | 6/2016 | Corwin | H04N 21/4758 | 725/24 |
| 2018/0091850 | A1* | 3/2018 | Sandholm | H04N 21/2668 | |

* cited by examiner

SYSTEMS AND METHODS FOR CREATING AND NAVIGATING BROADCAST-READY SOCIAL CONTENT ITEMS IN A LIVE PRODUCED VIDEO

CROSS-REFERENCES TO RELATED APPLICATIONS

This application is a continuation of U.S. patent application Ser. No. 16/422,843, filed May 24, 2019, which is a division of U.S. patent application Ser. No. 14/465,667 (now U.S. Pat. No. 10,349,140), filed Aug. 21, 2014, which claims the benefit of U.S. Provisional Patent Application No. 61/905,598, filed Nov. 18, 2013, the entire disclosures of which are hereby incorporated by reference herein for all purposes.

BACKGROUND

Currently, solutions for providing graphics in a produced video that include information from social media are inadequate. Existing techniques for causing a computer display operated by on-air talent to be presented in a produced live video require the display to be shown in the entire video, and lack the responsiveness and polish desired in professional video graphics. The creation of traditional graphics effects for social media in a produced live video is problematic for multiple reasons. Creation of such graphics is generally done by a graphic designer by hand, and is therefore overly time consuming. Furthermore, the presentation and navigation of such graphics is controlled by a director, engineer, or other off-stage personnel, and so on-air talent cannot control the presentation of the graphics to go along with an improvised delivery.

What is desired are solutions for presenting broadcast-ready on-air images of social media content items that can be easily controlled and directed by on-air talent while being filmed.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of providing graphics content for inclusion in a produced video is provided. A mobile computing device retrieves a set of social content items from a social media platform. The mobile computing device receives a selection of one or more social content items from the set of social content items for inclusion in an on-air queue. The mobile computing device generates an on-air format graphic for each content item in the on-air queue. The mobile computing device transmits a display signal including the on-air format graphics to be included in the produced video.

In some embodiments, a system for displaying and navigating social content item graphics in a produced video is provided. The system comprises a talent interface engine, a video generation engine, at least one video camera, and a video production system. The talent interface engine is configured to receive navigation commands from a user for navigating an on-air queue of social content items. The video generation engine is configured to create on-air format graphics based on the content items in the on-air queue of content items, and generate a video graphic signal that includes the on-air format graphics. The at least one video camera is configured to generate a live video signal. The video production system is configured to combine the live video signal from the at least one video camera and the video graphic signal from the mobile computing device to generate the produced video.

In some embodiments, a nontransitory computer-readable medium having computer-executable instructions stored thereon is provided. The instructions, in response to execution by one or more processors of a mobile computing device, cause the mobile computing device to perform actions for providing graphics content for inclusion in a produced video. The actions comprise retrieving, by the mobile computing device, a set of social content items from a social media platform; receiving, by the mobile computing device, a selection of one or more social content items from the set of social content items for inclusion in an on-air queue; generating, by the mobile computing device, an on-air format graphic for each content item in the on-air queue; and transmitting, by the mobile computing device, a display signal including the on-air format graphics to be included in the produced video.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

Figure 1:
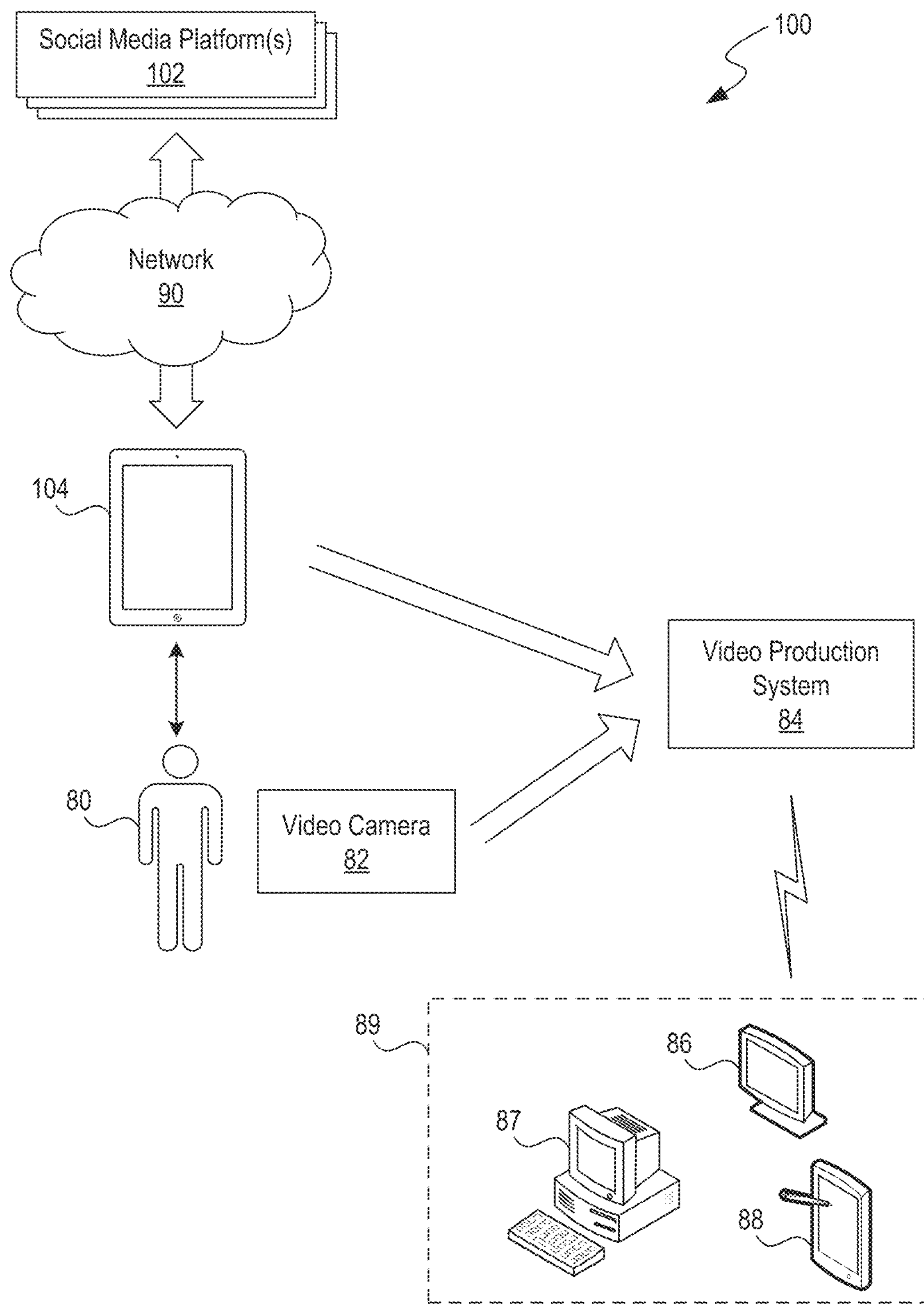
FIG. 1 is a schematic diagram that illustrates, at a high level, an exemplary embodiment of a system for displaying and navigating social media content items in a produced video according to various aspects of the present disclosure.

FIG. 1 is a schematic diagram that illustrates, at a high level, an exemplary embodiment of a system 100 for displaying and navigating social media content items in a produced video according to various aspects of the present disclosure. The system 100 allows a user 80 to search for and select social content items from one or more social media platforms 102 using a mobile computing device 104. Social media platforms 102 may include any platform by which information is publicly shared, including but not limited to Twitter, Facebook, Vine, Pinterest, LinkedIn, Instagram, Myspace, Google+, Qzone, Sina Weibo, Habbo, Friendster, Flickr, and/or the like.

The mobile computing device 104 retrieves social content items matching specified search parameters from the one or more social media platforms 102 via a network 90, which may include one or more of the Internet, a WAN, a LAN, a WiFi network, a cellular data network, a mobile data network such as 4G or LTE, and/or the like. The mobile computing device 104 then presents the retrieved social content items to the user 80 for selection and ordering in an on-air queue. The mobile computing device 104 then transmits the social content items from the on-air queue to a video production system 84 in a format suitable for presentation in a produced video. At the same time, a video camera 82 may be filming the user 80 and providing a live video signal including an image of the user to the video production system 84. The video production system 84 combines the social content items and the live video signal to create a produced video, which is then distributed in any suitable format to one or more viewers 89. For example, the produced video may be a broadcast video signal transmitted to a television 86, cable box, and/or the like. As another example, the produced video may be a streaming video signal transmitted to a desktop computing device 87 or a mobile computing device 88.

One specific, non-limiting example of the system 100 in action would be as follows. The user 80 may be a television news reporter, sometimes referred to as "on-air talent" or simply "talent." The on-air talent 80 uses the mobile computing device 104 to query for social media content items, such as tweets posted on Twitter (a social media platform 102), containing a keyword or hashtag relevant to a story being reported. The mobile computing device 104 submits a query to Twitter, and performs processing on a set of tweets received in response. The on-air talent 80 then uses the mobile computing device 104 to select and sort tweets from the query response into an on-air queue.

During a newscast, the on-air talent 80 places the mobile computing device 104 into an on-air mode. In the on-air mode, a first tweet from the on-air queue is transmitted in an on-air format by the mobile computing device 104 to the video production system 84, as is video of the on-air talent 80 from the video camera 82. The video production system 84 combines the on-air format graphic with the video of the on-air talent 80 as, for example, an over-the-shoulder digital on-screen graphic. The on-air talent 80 then navigates through the on-air queue using the mobile computing device 104, which causes the on-air format graphic in the produced video to change without further action being taken by a producer or engineer to manipulate the graphics. In this way, a high-quality graphic may be provided and seamlessly integrated with even an improvised statement and/or navigation through the tweets by the on-air talent 80.

While a live broadcast newscast is described above as an example of how an embodiment of the present disclosure may be used, this example should not be seen as limiting. Embodiments of the present disclosure may be used in any situation in which graphics are to be combined with live video and controlled by talent. For example, embodiments of the present disclosure may be used to produce a live video that will be recorded for later broadcast transmission, or for live or delayed streaming over a network. As another example, embodiments of the present disclosure may be used during a live presentation that is being locally simulcast, for example, on a video wall, a projection screen, a jumbotron or other large format video screen, and/or the like. Also, while graphics combined with live video are described, in some embodiments the system 100 may be used to present graphics alone. For example, the system 100 may be used to provide a full-screen graphic presentation that can be navigated by the on-air talent 80 while providing a voice over.

Figure 2:
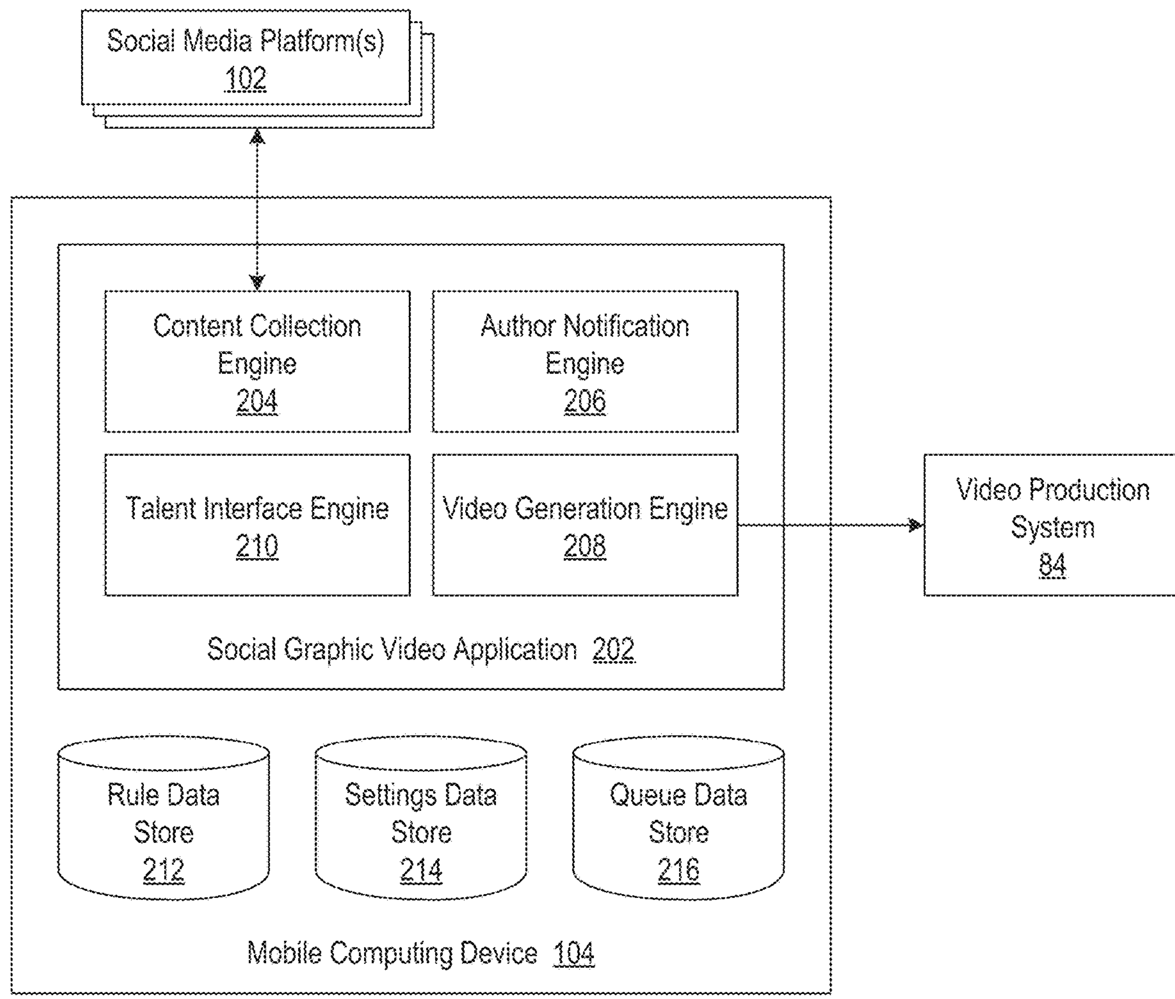
FIG. 2 is a block diagram that illustrates an exemplary embodiment of the mobile computing device in communication with one or more social media platforms and a video production system according to various aspects of the present disclosure.
Figure 3A:
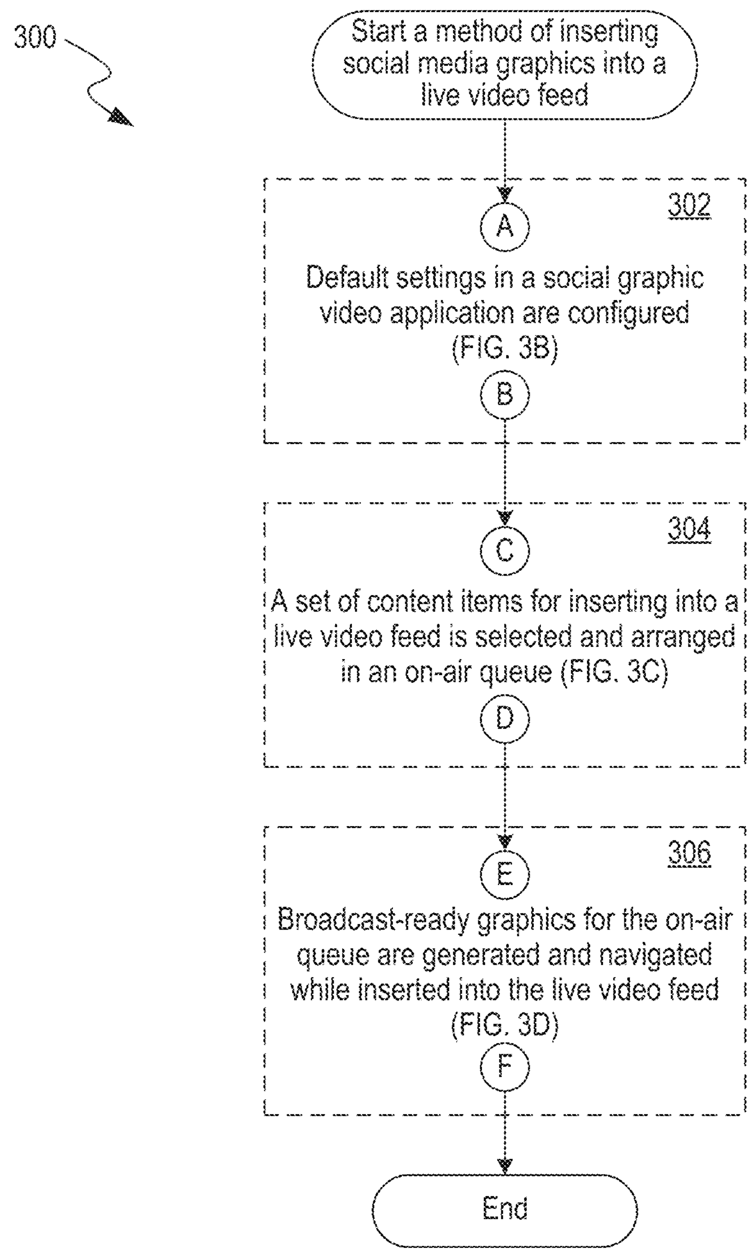
FIGS. 3A-3D are a flowchart that illustrates an exemplary embodiment of a method for inserting social media graphics into a live video feed according to various aspects of the present disclosure.
Figure 3B:
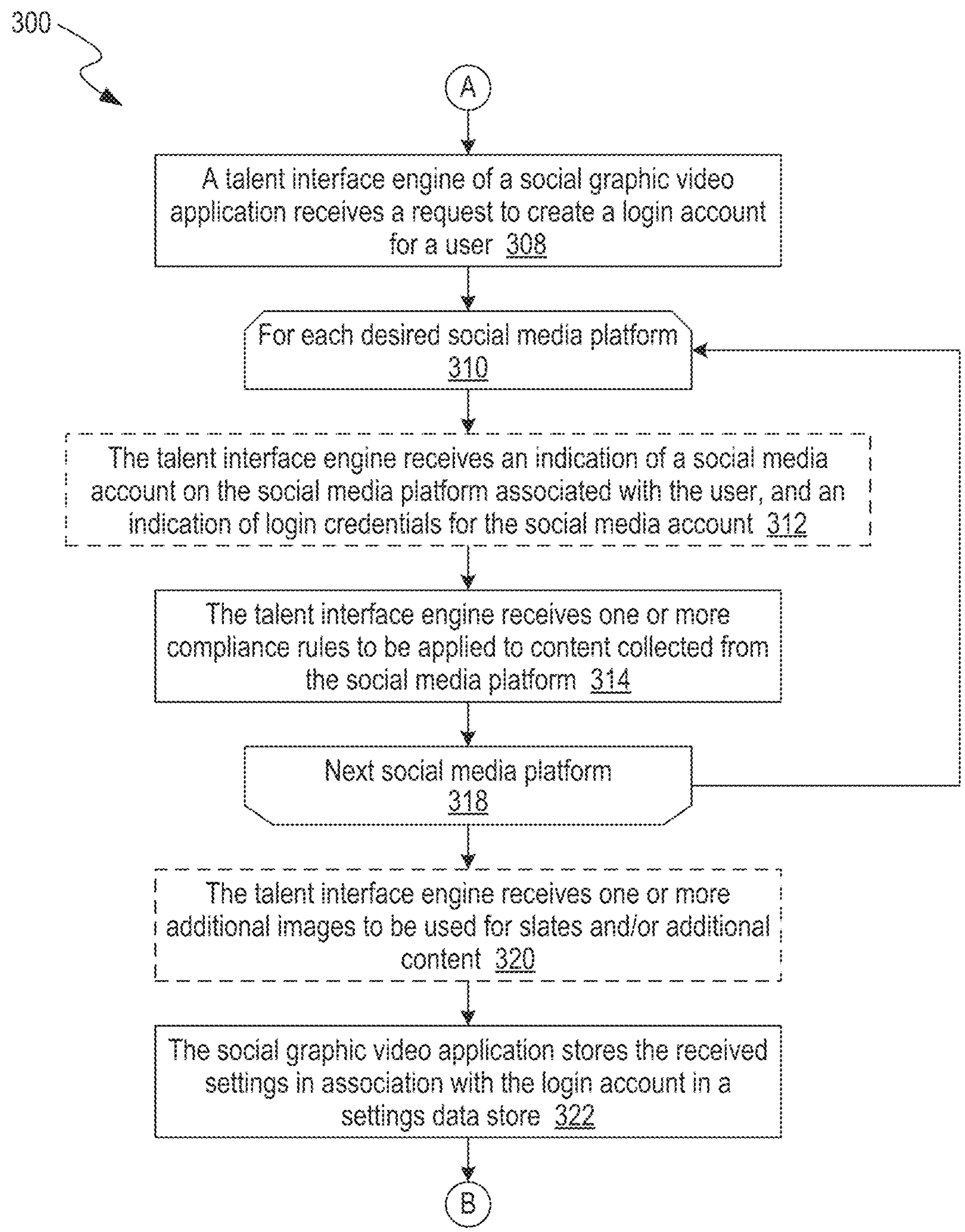
Figure 3C:
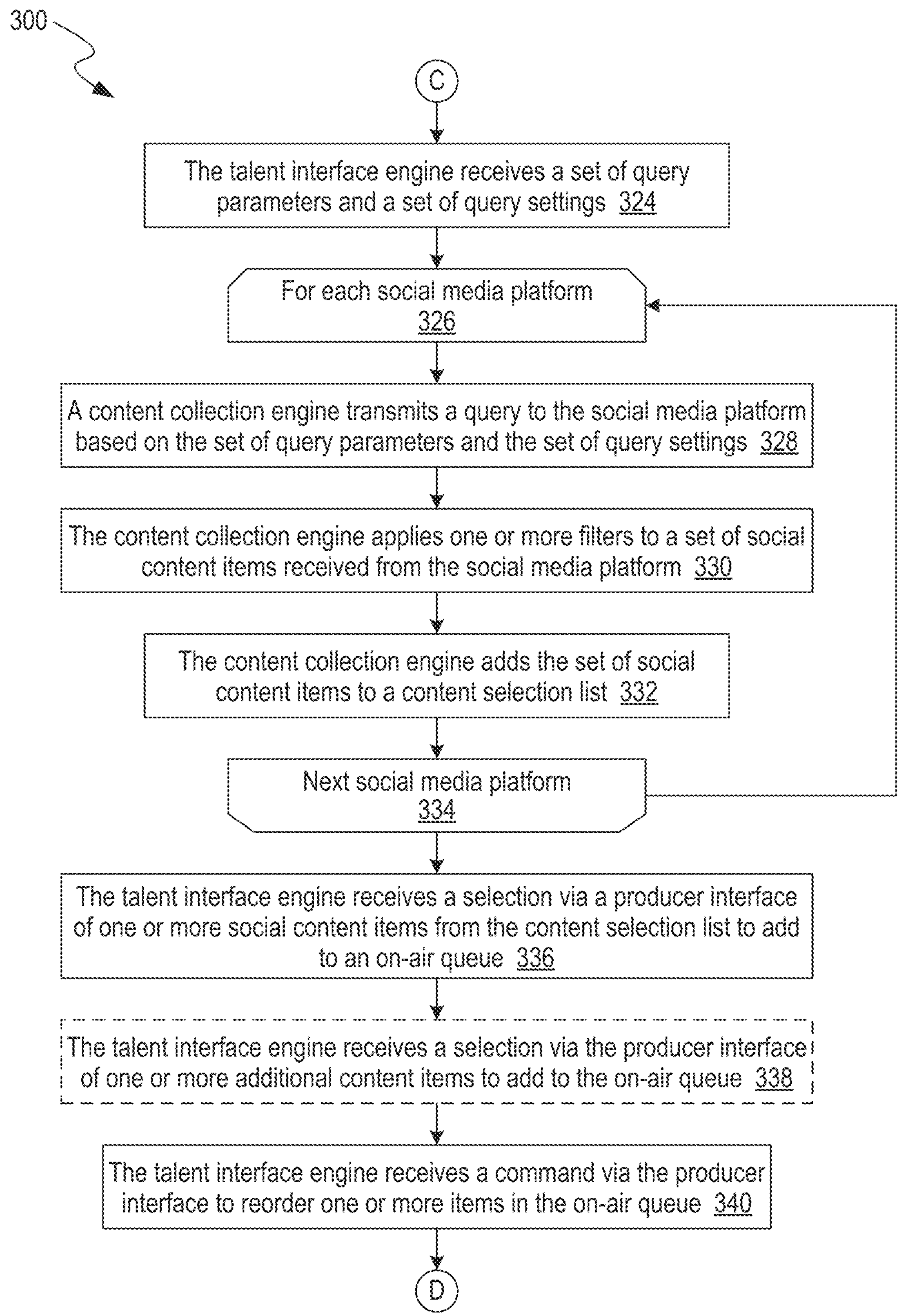
Figure 3D:
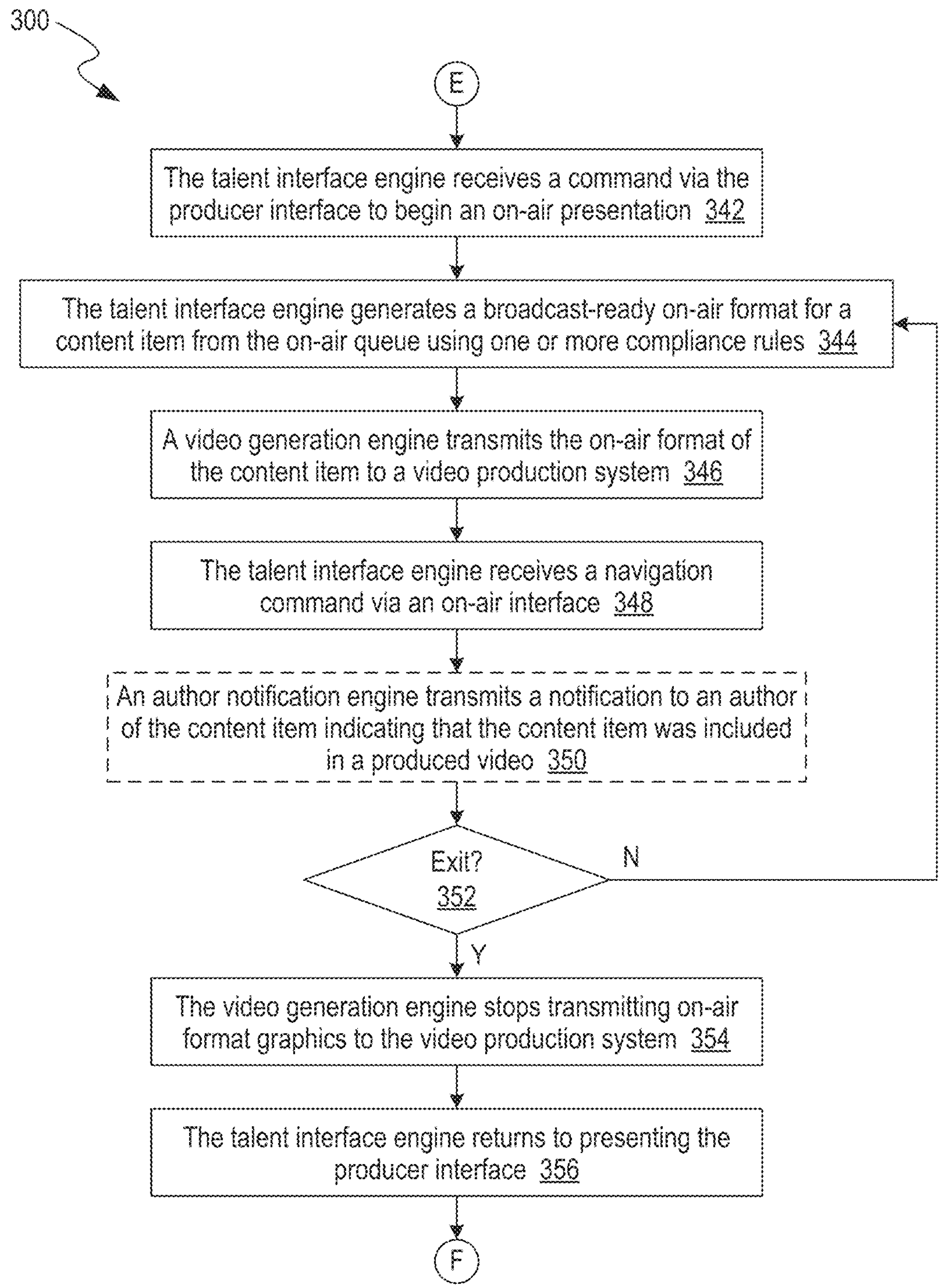

FIG. 2 is a block diagram that illustrates an exemplary embodiment of the mobile computing device 104 in communication with one or more social media platforms 102 and a video production system 84, according to various aspects of the present disclosure. As illustrated, a mobile computing device 104 is used to communicate with the social media platforms 102 and the video production system 84. In some embodiments, the mobile computing device 104 may be a touch-enabled computing device such as an iPad, a Surface, an Android tablet, and/or the like, that accesses the network 90 using a wireless connection. In some embodiments, a smaller touch-enabled computing device, like a smartphone (such as an iPhone, a Windows Phone, an Android Phone, and/or the like), a phablet (such as an iPad mini, a Kindle, and/or the like), or other suitable mobile computing device may be used.

The mobile computing device 104 is configured to execute a social graphic video application 202. In some embodiments, the social graphic video application 202 is an "app" downloaded from an "app store" or otherwise installed on the mobile computing device 104. In some embodiments, the interface elements of the social graphic video application 202 may be accessed by the user 80 using the mobile computing device 104, while some or all of the processing and logic is executed by one or more computing devices separate from the mobile computing device 104.

As illustrated, the social graphic video application 202 includes a content collection engine 204, an author notification engine 206, a video generation engine 208, and a talent interface engine 210. As understood by one of ordinary skill in the art, the word "engine," as used herein, refers to logic embodied in hardware or software instructions, which can be written in a programming language, such as C, C++, Objective-C, COBOL, JAVA™, PHP, Perl, HTML, CSS, JavaScript, Ruby, VBScript, ASPX, Microsoft.NET™ languages such as C#, and/or the like. An engine may be compiled into executable programs or written in interpreted programming languages. Software engines may be callable from other engines or from themselves. Generally, the engines described herein refer to logical modules that can be merged with other engines, or can be divided into sub-engines. The engines can be stored in any type of computer-readable medium or computer storage device and be stored on and executed by one or more general purpose computers, thus creating a special purpose computer configured to provide the engine.

In some embodiments, the content collection engine 204 is configured to transmit queries via the network 90 to one or more social media platforms 102 and to perform processing on social content items that are returned by the queries. In some embodiments, the content collection engine 204 may include separate modules for querying different social media platforms 102 (for example, a Twitter module, a Facebook module, an Instagram module, and/or the like). As described further below, the content collection engine 204 may query and process social content items from multiple social media platforms 102, and may subsequently provide them in a consistent format for review regardless of the source social media platform 102.

In some embodiments, the author notification engine 206 is configured to transmit notifications to authors of social content items that are used by the system 100. For example, in some embodiments, the author notification engine 206 may transmit a notification to an author of a social content item after a broadcast-ready version of the social content item has been generated and sent to the video production system 84 for inclusion in a produced video. The notification may take any suitable form, and may differ according to a user setting or the particular social media platform 102. For example, a notification sent to the author of a tweet may include one or more of a "favorite," a retweet, a mention, an "@reply," or a direct message. Meanwhile, a notification sent to the author of a Facebook post may include one or more of a "like," a message, a comment, or a share. As another example, a notification may be sent via a separate communication medium, such as email, a notification web page, a credit graphic, and/or via any other suitable means.

In some embodiments, the talent interface engine 210 is configured to provide a user interface on the mobile computing device 104 that a user 80 may use to interact with the system 100. In some embodiments, interfaces produced by the talent interface engine 210 are configured to support touch interactions, such as swiping, taps, and/or the like. In some embodiments, the talent interface engine 210 generates one or more interfaces, including interfaces that allow a user 80 to provide user settings for the system 100, to generate and submit queries to one or more social media platforms 102 for social content items, to select social content items for an on-air queue, to arrange the on-air queue, and to navigate the on-air queue while broadcast-ready on-air format versions of content items in the on-air queue are being provided to the video production system 84. Further descriptions of the interfaces generated by the talent interface engine 210 are provided below.

In some embodiments, the video generation engine 208 is configured to produce broadcast-ready on-air format images based on social content items, and to cause the images to be transmitted in a video signal to the video production system 84. The video signal may be transmitted from the mobile computing device 104 to the video production system 84 using any suitable technique. For example, in some embodiments, the video generation engine 208 is configured to transmit a video stream, such as an H.264 encoded video stream, via a network protocol such as TCP/IP to a receiver coupled to the video production system 84. The receiver (not illustrated) may be coupled to the video production system 84 by an HDMI cable or other cable capable of transmitting a video and/or audio signal. The video stream transmitted in such an embodiment may mirror the display of the mobile computing device 104 that is presented to the user 80. One example of technology usable in such an embodiment is AirPlay screen mirroring provided by Apple, Inc., to mirror a display of a mobile computing device 104 such as an iPad to produce a video signal consumable by a video production system 84. However, in some embodiments, other technology may be used. For example, in some embodiments, hardware or software technology may be used that allows a different signal to be transmitted to the video production system 84 than the image presented to the user 80 by the mobile computing device 104. As an example of such an embodiment, in an on-air mode a producer or controller interface may include a small window that includes the broadcast-ready on-air image, and the content of the small window is transmitted to the video production system 84 while the remainder of the interface presents navigation controls, interaction controls, and/or the like.

As illustrated, the mobile computing device 104 is also configured to provide a rule data store 212, a settings data store 214, and a queue data store 216. As understood by one of ordinary skill in the art, a "data store" as described herein may be any nontransitory computer-readable medium configured to store data for access by the mobile computing device 104. Typically, a data store may include data stored in an organized manner in a volatile or nonvolatile memory within the mobile computing device 104. The social graphic video application 202 is given read/write access to the volatile or nonvolatile memory by an operating system of the mobile computing device 104. One other example of a data store is a highly reliable, high-speed relational database management system (DBMS) executing on one or more computing devices and accessible by the mobile computing device 104 over a high-speed packet switched network. However, any other suitable storage technique and/or device capable of providing access to the stored data in response to requests from the social graphic video application 202 may be used instead of or in addition to these examples. One of ordinary skill in the art will recognize that separate data stores described herein may be combined into a single data store, and/or a single data store described herein may be separated into multiple data stores, without departing from the scope of the present disclosure.

In some embodiments, the rule data store 212 is configured to store a set of compliance rules for one or more social media platforms 102. In some embodiments, the compliance rules may indicate what types of social content items from a given social media platform 102 may be used by the system 100. In some embodiments, the compliance rules may specify a format for creating a broadcast-ready on-air graphic for a social content item from a given social media platform 102. For example, a compliance rule for Twitter may specify a location, font, and background for tweet text; a location and font for a user handle; a location for a user profile picture; and/or the like. A compliance rule may also include information that is specific to a user and not to a particular social media platform 102, such as a slate (or other background), a bug (or other branding information to be inserted regardless of the particular social media platform 102), and/or the like.

In some embodiments, the settings data store 214 is configured to store settings information for a user 80 of the system 100. For example, the settings may include a default slate, login credentials for one or more social media accounts associated with the user 80, default settings for filters such as a profanity filter or location filter, and/or the like. Further description of settings that may be stored in the settings data store 214 for a user 80 is provided below.

In some embodiments, the queue data store 216 may be configured to store one or more on-air queues for one or more users 80. The queue data store 216 may be used in embodiments wherein the user 80 manages the on-air queue at a point in time before it is needed for creating broadcast-ready on-air format graphics for transmission to the video production system 84. That is, in some embodiments, a user 80 may search for social content items and arrange the on-air queue before it is needed for broadcast, and the on-air queue may be saved in the queue data store 216. In some embodiments, content items may be added to the on-air queue and stored in the queue data store 216 by a user other than the user 80. For example, a producer may pre-load an on-air queue through a web-based interface to the system 100, and the user 80 may later review and/or revise the on-air queue before going to air. Further description of a method for selecting and organizing content items in an on-air queue is provided below.

As illustrated and described above, the engines 204, 206, 208, 210 and data stores 212, 214, 216 are provided by a mobile computing device 104. In some embodiments, one or more of these elements may be provided by a different computing device. For example, one or more of the data stores 212, 214, 216 could be provided by a separate computing device, and the mobile computing device 104 may access the data stores on the separate computing device via a network. As another example, the logic and functionality provided by one or more of the content collection engine 204 and the author notification engine 206 may be provided by a separate computing device, and the mobile computing device 104 may access said functionality through an application programming interface (API) or other suitable technique. As still another example, the logic behind the interfaces presented by the talent interface engine 210 may be provided by a separate computing device, while the interactive portion of the interfaces presented by the talent interface engine 210 are provided by the mobile computing device 104. One example of such an embodiment would be if the interfaces are provided by a web app, wherein the logic is provided by a web server while the interface is rendered by the mobile computing device 104.

As illustrated and described above, the content collection engine 204 may submit queries directly to one or more social media platforms 102. In some embodiments, the content collection engine 204 may also submit queries to other types of data sources. For example, the content collection engine 204 may submit queries to search engines other than the social media platforms 102 that index content on the social media platforms 102. As another example, the content collection engine 204 may submit queries to a content aggregation service such as Tagboard that may collect social content items from multiple social media platforms 102 and provides access to the collected items in a single location.

FIGS. 3A-3D are a flowchart that illustrates an exemplary embodiment of a method 300 for inserting social media graphics into a live video feed according to various aspects of the present disclosure. From a start block, the method 300 proceeds to a set of method steps 302 defined between a start terminal ("terminal A") and an exit terminal ("terminal B"), wherein default settings in a social graphic video application are configured.

From terminal A (FIG. 3B), the method 300 proceeds to block 308, where a talent interface engine 210 of a social graphic video application 202 receives a request to create a login account for a user 80. As described above, in some embodiments, the talent interface engine 210 presents interfaces and receives input via the mobile computing device 104. The login account may be used to store preferences for the user 80 within the system 100, manage a subscription for the user 80 within the system 100, access historical information for the user 80 such as past on-air queues, control access to the system 100, and/or the like.

Next, the method 300 proceeds to a for loop defined between a for loop start block 310 and a for loop end block 318. Within the for loop 310-318, the method 300 includes actions for configuring the social graphic video application 202 to obtain social content items from a given social media platform 102. Accordingly, from the for loop start block 310, the method 300 proceeds to optional block 312, where the talent interface engine 210 receives an indication of a social media account on the social media platform 102 associated with the user 80, and an indication of login credentials for the social media account. Block 312 is optional, because for some social media platforms 102, an account with the social media platform 102 may not be required to submit queries for social content items (even if an account is required to post social content items on the social media platform 102). For example, a user 80 may submit queries and receive search results from Twitter without logging in with a Twitter account.

The method 300 proceeds to block 314, where the talent interface engine 210 receives one or more compliance rules to be applied to content collected from the social media platform 102. One type of compliance rule provides a format template for presenting content from the social media platform 102 in a broadcast-ready graphic that complies with content reuse guidelines promulgated by the social media platform 102. Multiple compliance rules may be provided for different types of content from the social media platform 102. Once received, the compliance rules may be stored in the rule data store 212 for later use.

Figure 10:
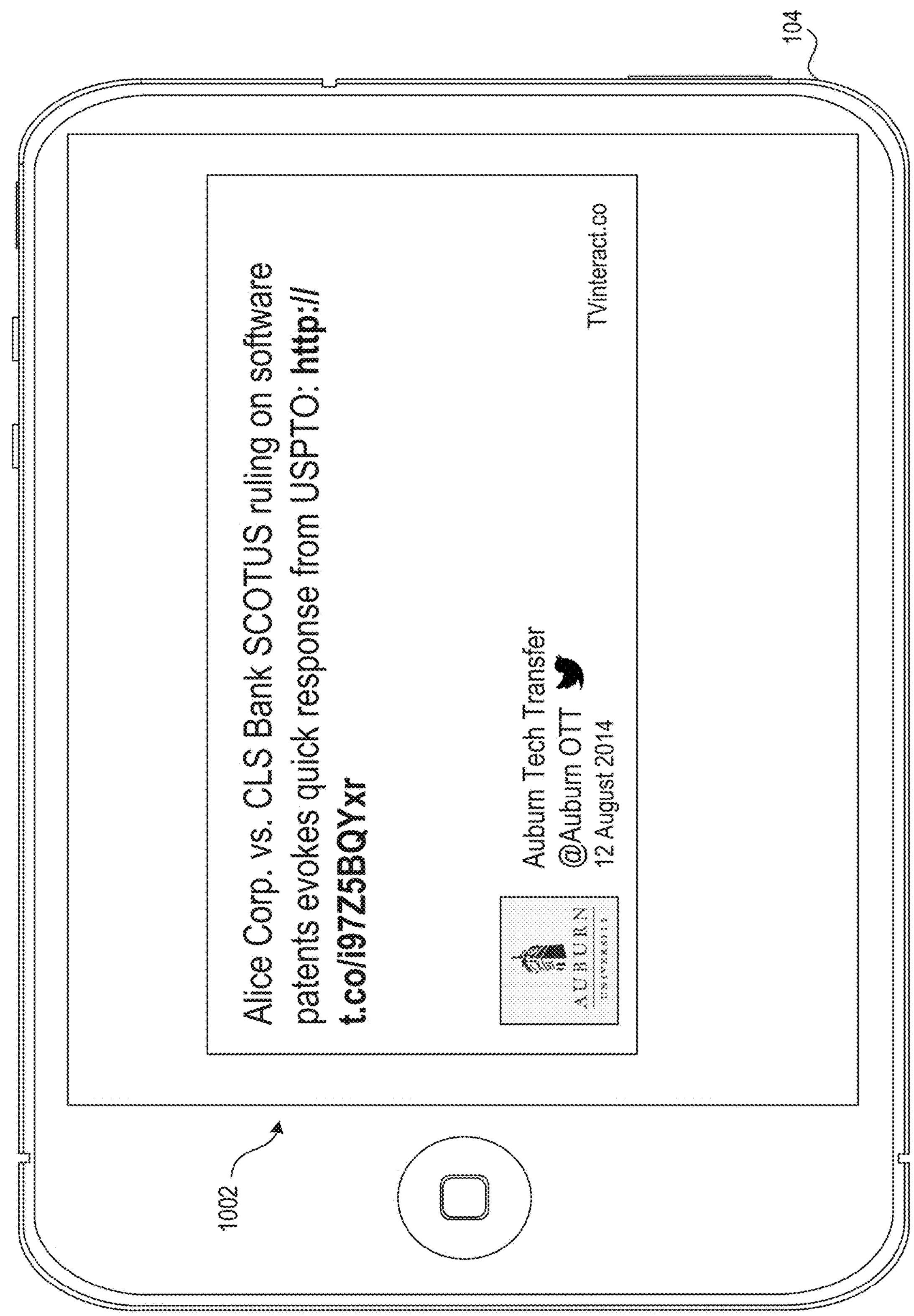
FIG. 10 illustrates an exemplary embodiment of an on-air interface presented to the user after receiving the command to begin the on-air presentation from the producer interface illustrated in FIG. 9 according to various aspects of the present disclosure.
Figure 11:
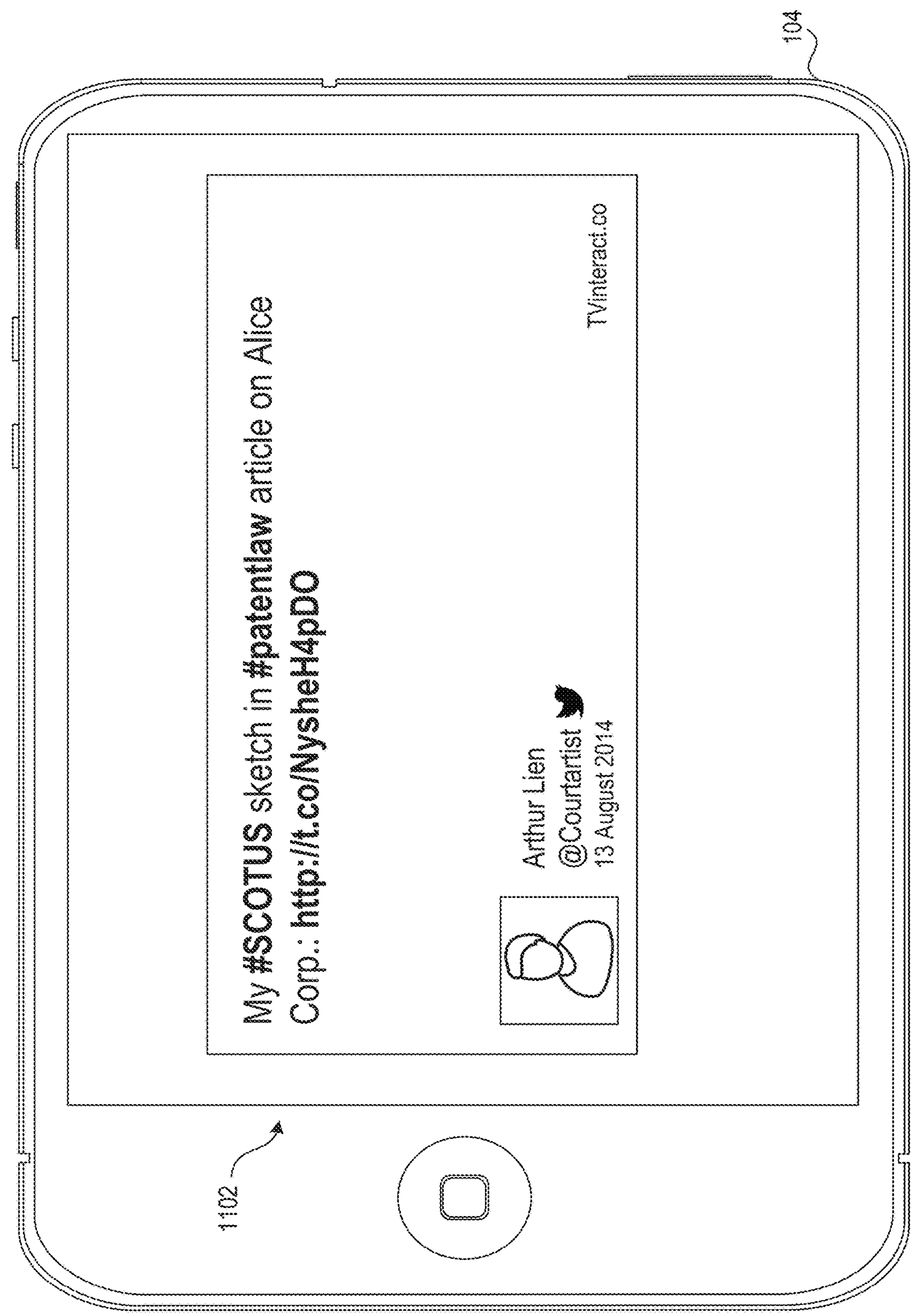
FIG. 11 illustrates an exemplary embodiment of an on-air interface presented to the user after receiving a navigation command in the on-air interface illustrated in FIG. 10 according to various aspects of the present disclosure.
Figure 13:
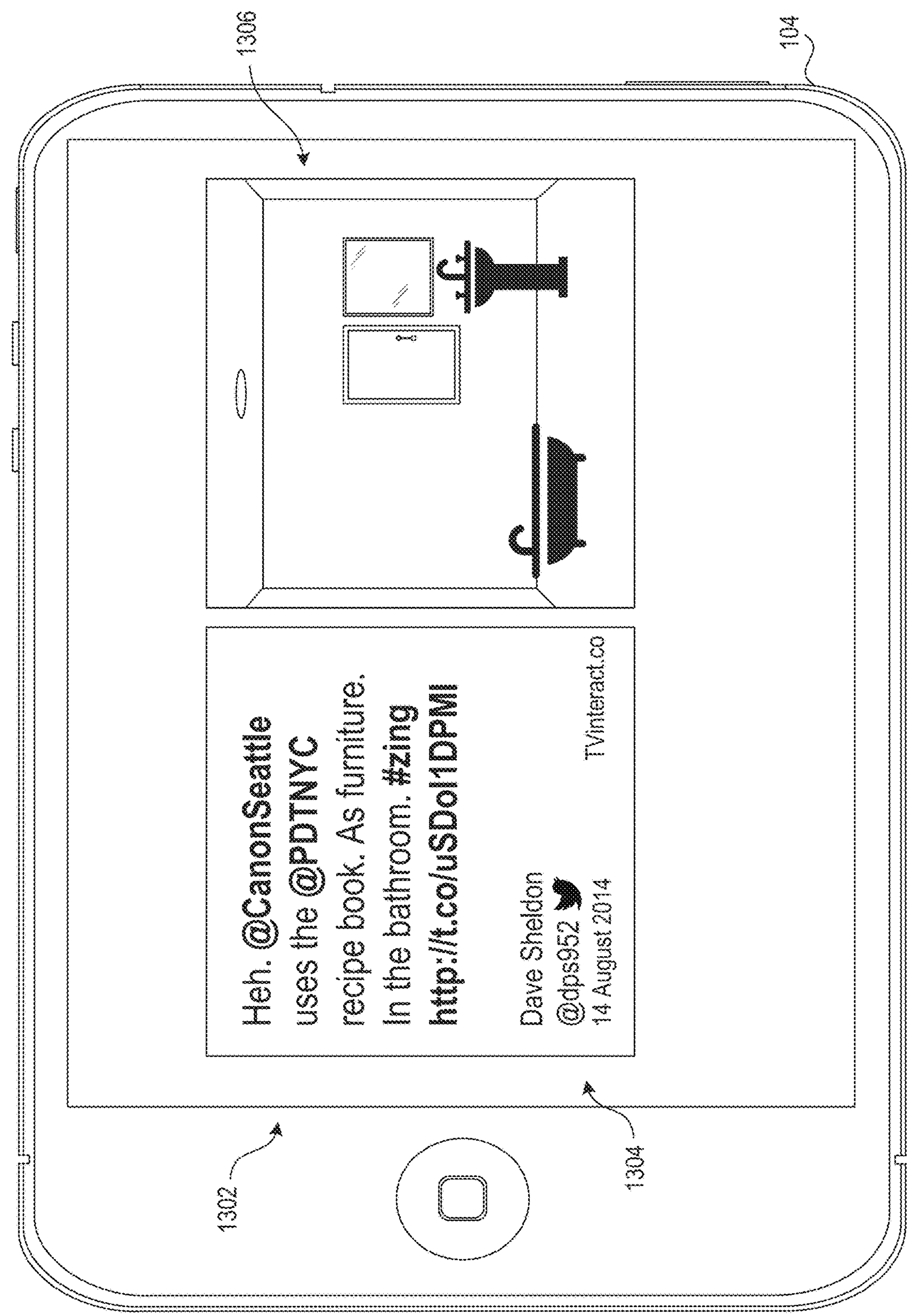
FIGS. 13 and 14 illustrate an exemplary embodiment of interfaces presented when a user zooms in to an image for a social content item that includes an image according to various aspects of the present disclosure.

FIGS. 10, 11, and 13 illustrate several nonlimiting examples of broadcast-ready graphics that present content from tweets retrieved from Twitter according to various aspects of the present disclosure. These examples illustrate the use of compliance rules in that the tweet content has been arranged according to the format templates in the compliance rules for Twitter. For example, the format template for a tweet with no attached image (as seen in FIGS. 10 and 11) provides a font and location for the tweet text, a location at the lower left for the user image, fonts and locations for the user name and user handle, a location for the Twitter bird logo, and a font and location for the posting date. The format template may also include standard content such as a background image, a shaded area for behind the tweet content, a logo associated with the system 100 or the broadcaster, and/or the like. As can be seen in the differences between FIGS. 10 and 11, the tweets are presented in a consistent format, with only the content obtained from the tweet changing. As another example, a different format template may be used for a tweet that has an attached image. As can be seen in FIG. 13, a different format template has been used, in which the tweet information is placed to the left side of the graphic, and the right side of the graphic is reserved for a large version of the attached image. FIG. 13 also illustrates that, for a user that does not have an associated profile image, the layout may be altered to avoid having a blank space where the profile image would otherwise be displayed.

Returning to FIG. 3B, the method 300 then proceeds to the for loop end block 318. If the user 80 wishes to configure an additional social media platform 102 for use with the system 100, the method 300 returns from the for loop end block 318 to the for loop start block 310. Otherwise, the method 300 proceeds to optional block 320. At optional block 320, the talent interface engine 210 receives one or more additional images to be used for slates and/or as additional content. For example, the talent interface engine 210 may access photos or other images stored on the mobile computing device 104 to be used as a user photo, a background, a slate, a bug, a logo, or for any other use. Block 320 is optional because, in some embodiments, a default slate or no slate may be adequate, and/or no other additional images or content may be desired. The additional images may be stored in the rule data store 212, where compliance rules may utilize the additional images, or in the settings data store 214, where the images may be associated with the login account.

At block 322, the social graphic video application 202 stores the received settings in association with the login account in a settings data store 214. The storage of the settings allows the settings to be reused during subsequent times the user 80 accesses the social graphic video application 202 without having to reprogram the settings each time. Also, in some embodiments, the login account and stored settings may allow more than one user (e.g., different newscasters on different programs), to share a mobile computing device 104 and use different settings without having to reconfigure the social graphic video application 202 each time the user 80 changes.

Figure 4:
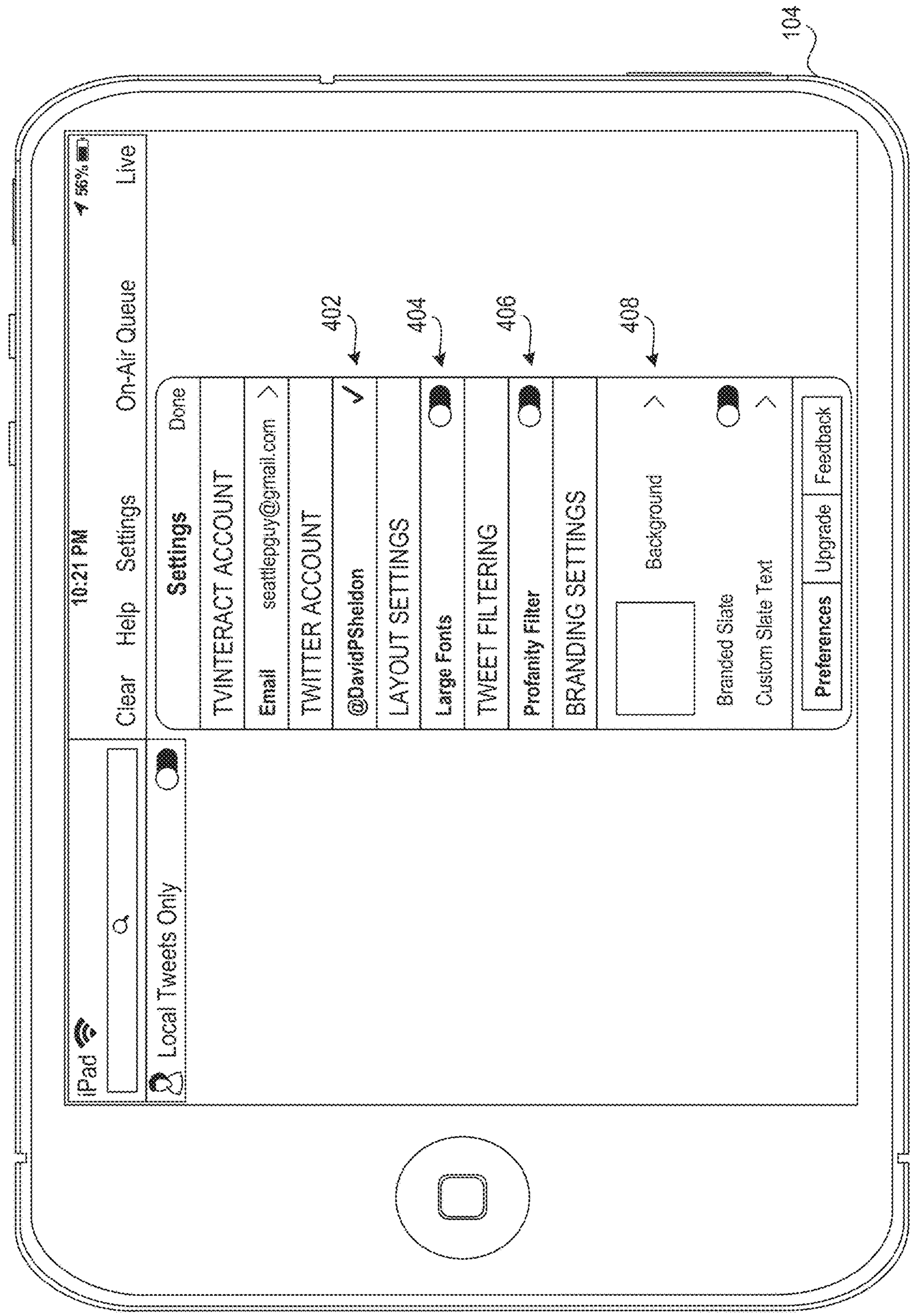
FIG. 4 illustrates an exemplary embodiment of an interface used to specify settings for a user according to various aspects of the present disclosure.

FIG. 4 illustrates an exemplary embodiment of an interface used to specify settings for a user 80 according to various aspects of the present disclosure. As illustrated, a Twitter account 402 is specified, and may be used to log into the associated social media platform 102 in order to attribute searches and postings to the indicated user. Other settings, such as a profanity filter 406 and the use of small or large fonts 404 may also be changed by using switches in the settings interface. As illustrated, default background images 408 and branded slates may also be configured using the settings interface.

Returning to FIG. 3B, from block 322 the method 300 proceeds to terminal B, and from terminal B (FIG. 3A) to a set of method steps 304 defined between a start terminal ("terminal C") and an exit terminal ("terminal D") wherein a set of content items for inserting into a live video feed is selected and arranged in an on-air queue.

From terminal C (FIG. 3C), the method 300 proceeds to block 324, where the talent interface engine 210 receives a set of query parameters and a set of query settings. The set of query parameters may include various terms to include in the search query that are supported by the social media platform 102, such as search keywords, hashtags, Boolean operators, and/or the like. The set of query settings are similar to the query parameters, though in some embodiments the query settings may include some settings that are applied after the results are returned from the social media platform 102 instead of being applied by the social media platform 102 itself. Some examples of query settings include but are not limited to only local posts, only posts that do not include profanity, only posts that are fully available to the public, only posts in a specified language, only posts of a particular type, and/or the like.

Figure 5:
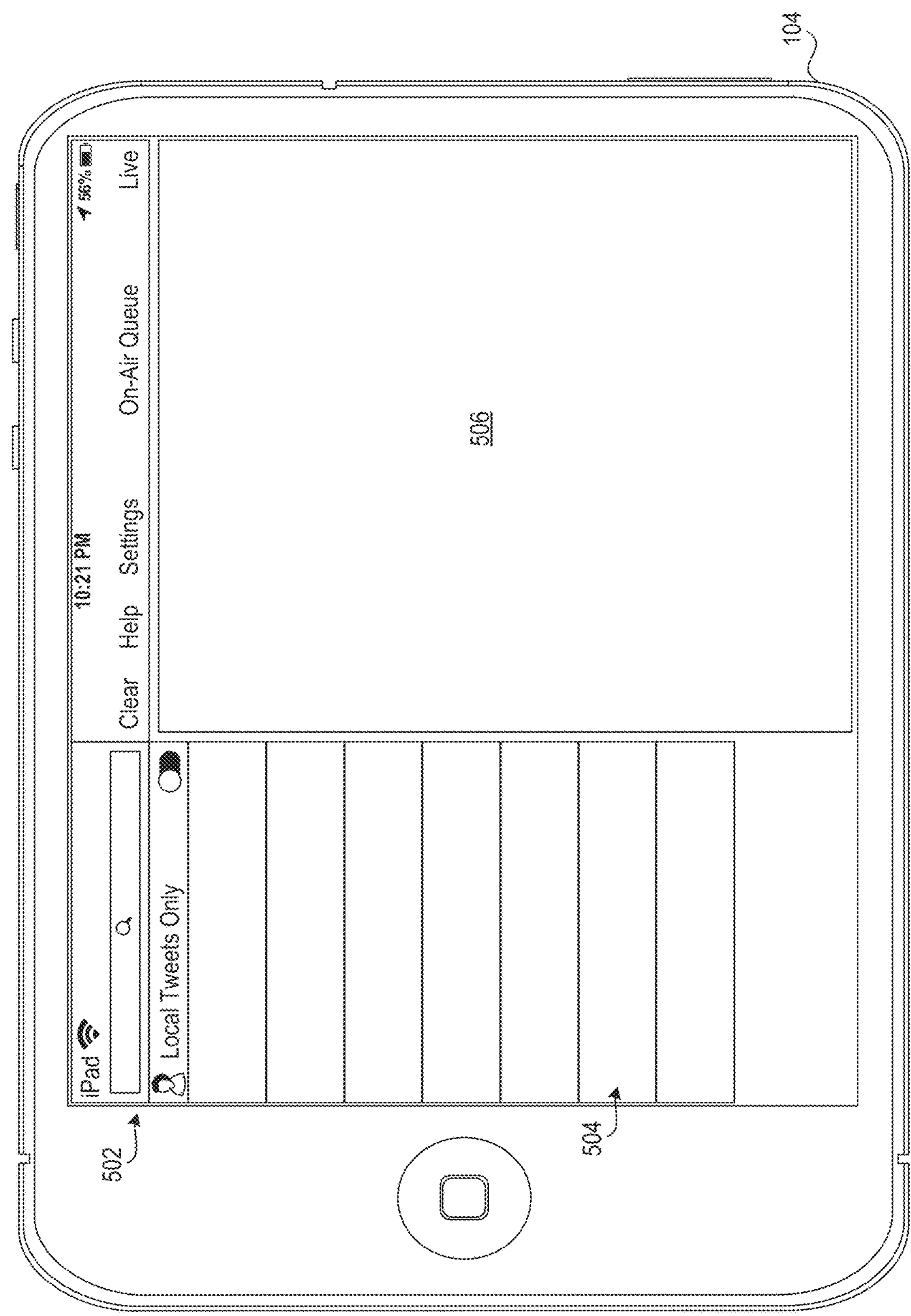
FIG. 5 illustrates an exemplary embodiment of a producer interface presented by the talent interface engine that is ready to receive a set of query parameters and a set of query settings according to various aspects of the present disclosure.

FIG. 5 illustrates an exemplary embodiment of a producer interface presented by the talent interface engine 210 that is ready to receive a set of query parameters and a set of query settings. A search box 502 is provided to receive the query parameters from the user 80. One or more switches 503 may also be provided to change query settings. In some embodiments, query settings may already have been specified along with the other user settings. A content selection list area 504 is illustrated, but is currently empty because a query has not yet been transmitted. An on-air queue area 506 is also empty, because no content items have yet been selected for inclusion in the on-air queue.

Returning to FIG. 3C, the method 300 then proceeds to a loop defined between a for loop start block 326 and a for loop end block 334. Within the for loop 326-334, the method 300 includes actions for retrieving and processing query results from a given social media platform 102.

From the for loop start block 326, the method 300 proceeds to block 328, where a content collection engine 204 transmits a query to the given social media platform 102 based on the set of query parameters and the set of query settings. Next, at block 330, the content collection engine 204 applies one or more filters to a set of social content items received from the social media platform. In some embodiments, the filters applied may be based on the set of query settings. For example, a profanity filter may be applied if a query setting indicated that it should be used. As another example, if a query setting indicated that only local posts should be used and the social media platform 102 will not perform such filtering, a filter may be applied by the content collection engine 204 that checks the geolocation of the received social content items. At block 332, the content collection engine 204 adds the set of social content items to a content selection list. The presentation of the social content items in the content selection list may change depending on filters (e.g., if a profanity filter is enabled, a social content item may be shaded to indicate the presence of profanity), depending on the type of item, or based on other suitable factors.

The method 300 then proceeds to the for loop end block 334. If the content collection engine 204 is configured to query more than one social media platform 102, then the method 300 returns from the for loop end block 334 to the for loop start block 326 to process the next social media platform 102. Otherwise, the method 300 proceeds to block 336. Though this description has indicated that the actions in the for loop 326-334 occur in series for each social media platform 102, in some embodiments the actions in the for loop 326-334 may occur in parallel for two or more social media platforms 102. Also, though this description has indicated that the actions in the for loop 326-334 occur once for a given social media platform 102, in some embodiments at least some of the actions may be repeated multiple times for a given social media platform 102, including, for example, cases in which more than one page worth of search results is desired and an additional query must be transmitted to receive an additional page worth of search results.

Figure 6:
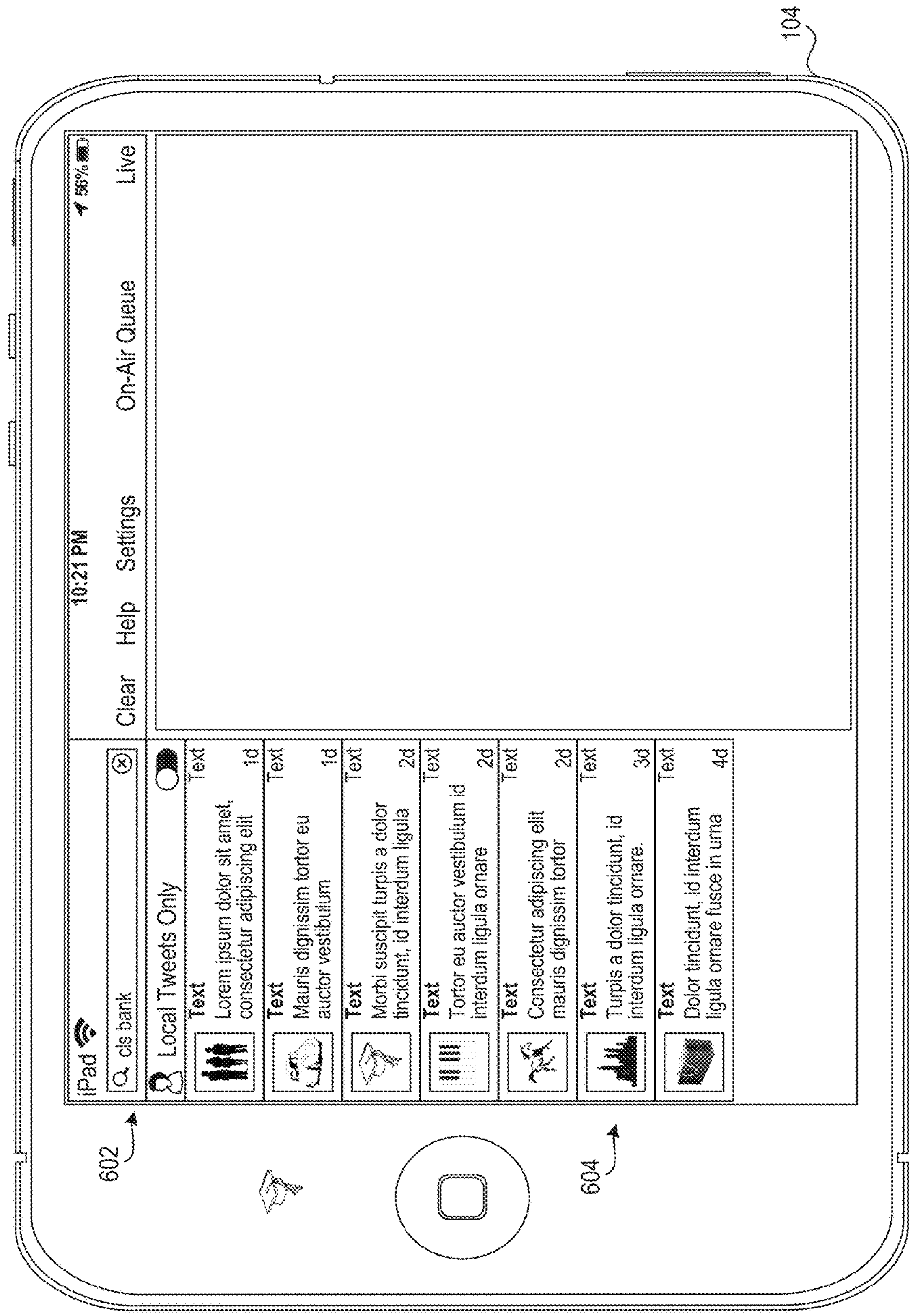
FIG. 6 illustrates an exemplary embodiment of a producer interface presented by the talent interface engine that has received a set of query parameters and is presenting a content selection list for review by the user according to various aspects of the present disclosure.

FIG. 6 illustrates an exemplary embodiment of a producer interface presented by the talent interface engine 210 that has received a set of query parameters and is presenting a content selection list for review by the user 80. The search box 502 continues to display the query parameters that were used to generate the search, and the content selection list area 604 displays the results that were returned.

Figure 7:
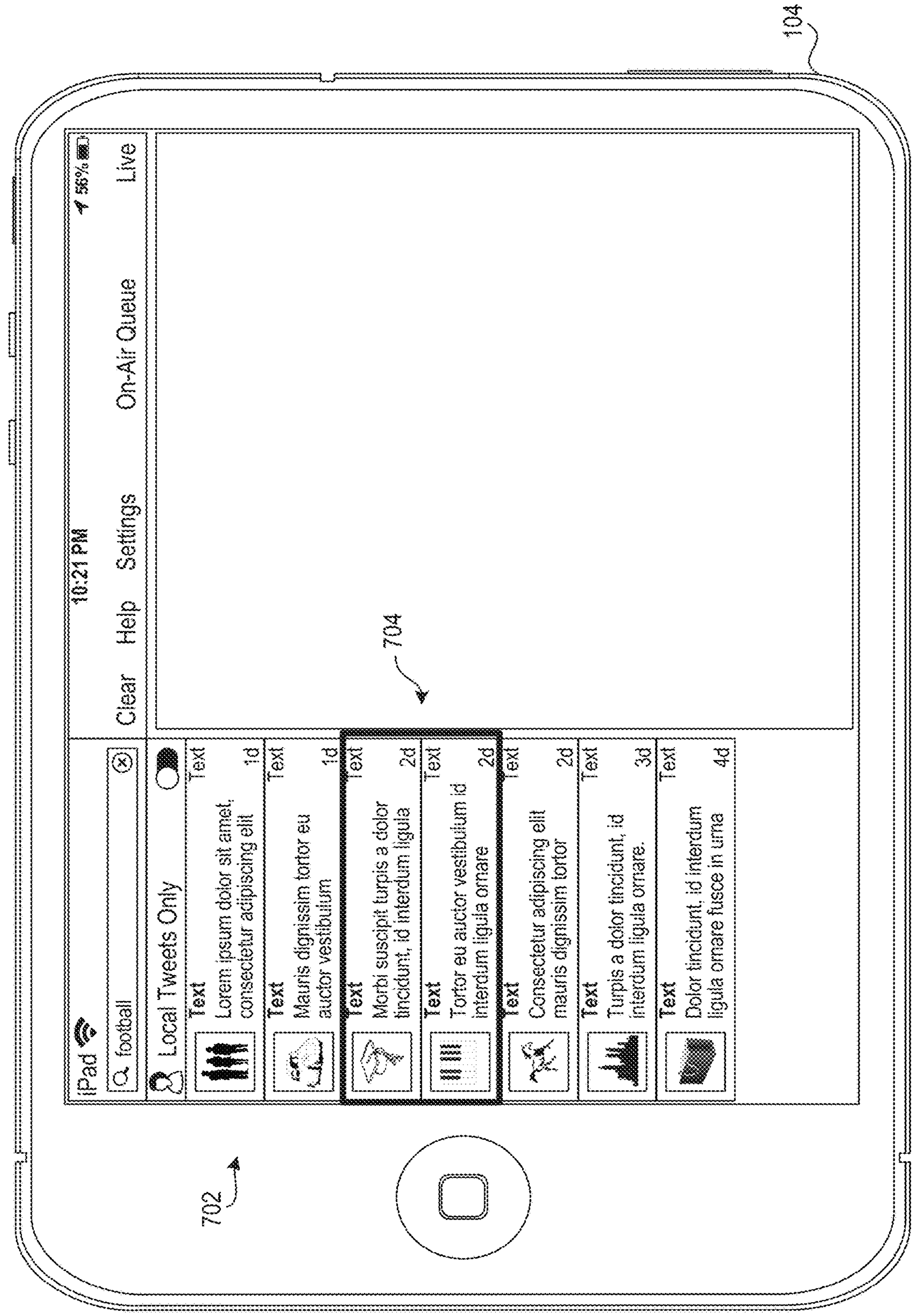
FIG. 7 illustrates another exemplary embodiment of a producer interface presented by the talent interface engine that has received a set of query parameters and is presenting a content selection list for review by the user according to various aspects of the present disclosure.

FIG. 7 illustrates another exemplary embodiment of a producer interface presented by the talent interface engine 210 that has received a set of query parameters and is presenting a content selection list for review by the user 80. In FIG. 7, the search has been performed for local tweets only, and with a profanity filter turned on. The content selection list area 702 includes two social content items 704 that were found to contain profanity, and so are presented in a darker shade than the other social content items in the content selection list. In some embodiments, the profanity filter may exclude the social content items from the list altogether, but as illustrated, the social content items may be presented to the user 80 anyway for review so that the user 80 can decide whether the social content item is appropriate for air or not.

Returning to FIG. 3C, at block 336 the talent interface engine 210 receives a selection via a producer interface of one or more social content items from the content selection list to add to an on-air queue. In some embodiments, the user 80 may swipe or drag content items from the content selection list into the on-air queue in order to indicate the selection. At optional block 338, the talent interface engine 210 receives a selection via the producer interface of one or more additional content items to add to the on-air queue. The additional content items may include images that were previously added to the system 100 while configuring settings, such as slates, interstitial images to be displayed between social content items, and/or the like. Block 338 is optional because in some embodiments, no additional content items may be desired, and in some embodiments, the ability to specify additional content items that are not social content items returned in the search may not be provided.

The method 300 then proceeds to block 340, where the talent interface engine 210 receives a command via the producer interface to reorder one or more items in the on-air queue. The commands for reordering items may be provided using any suitable technique or gesture, such as dragging and dropping, swiping, tapping a forward/back control, and/or the like. The commands for reordering items may include commands for removing items from the on-air queue. A deletion command may be provided using any suitable technique or gesture, such as swiping, single- or double-tapping a delete control, and/or the like.

Figure 8:
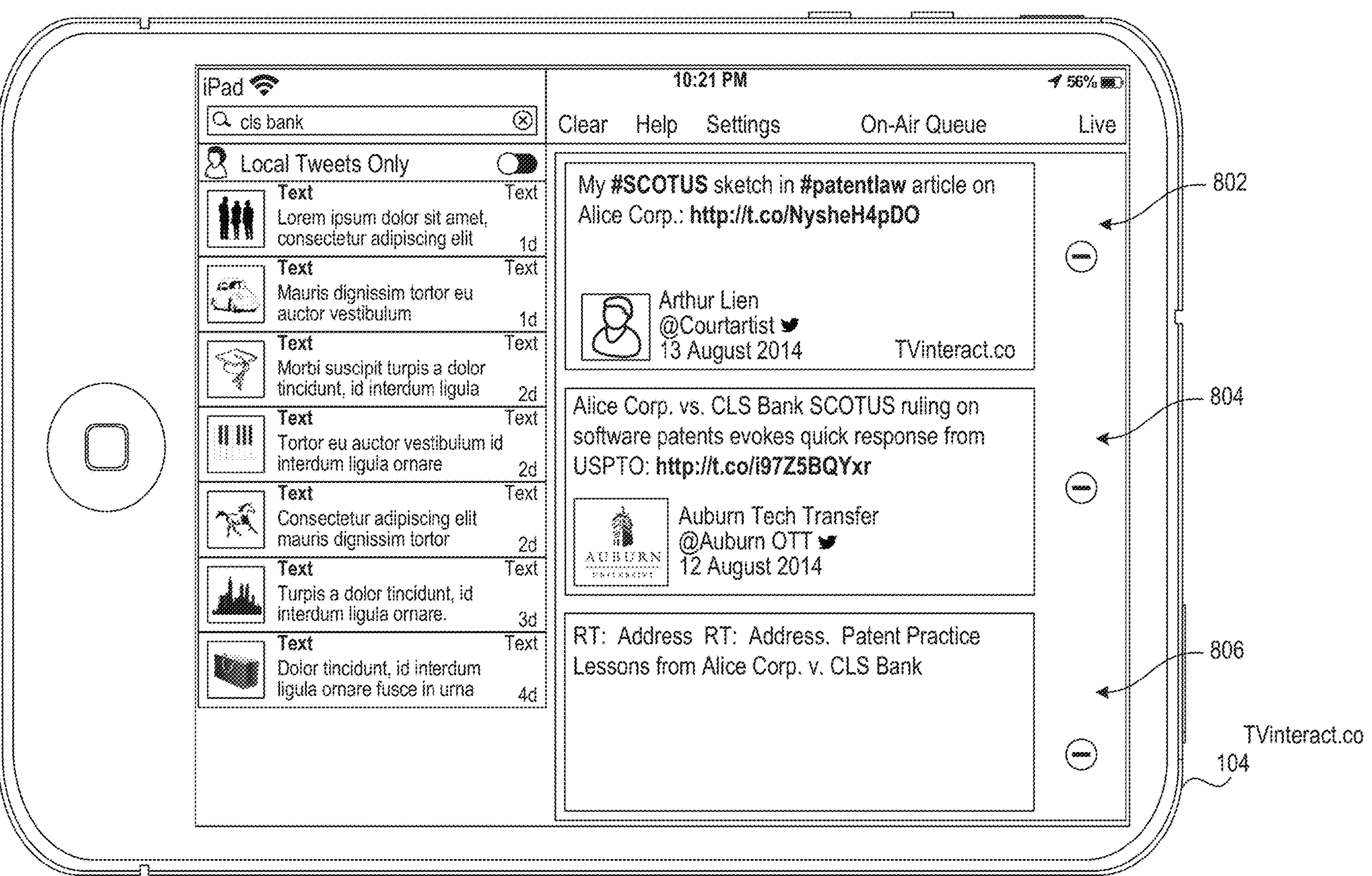
FIG. 8 illustrates an exemplary embodiment of a producer interface presented by the talent interface engine wherein a set of social content items have been selected by the user and placed in the on-air queue according to various aspects of the present disclosure.
Figure 9:
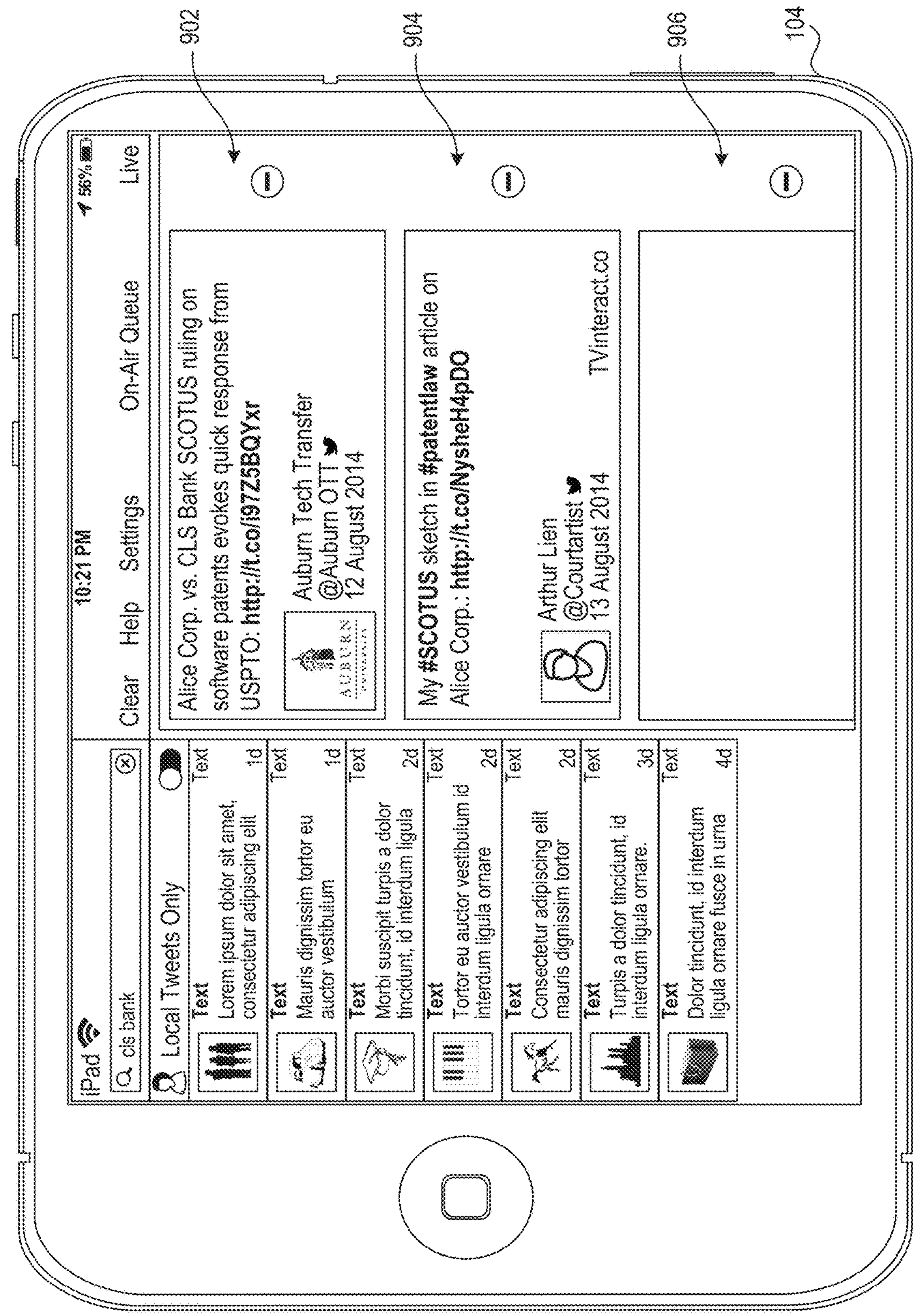
FIG. 9 illustrates another view of the embodiment of the producer interface illustrated in FIG. 8, wherein the on-air queue has been reordered by the user.

FIG. 8 illustrates an exemplary embodiment of a producer interface presented by the talent interface engine 210 wherein a set of social content items have been selected by the user 80 and placed in the on-air queue. As stated above, the social content items may be dragged from the content selection list area into the on-air queue area. The on-air queue is ordered, such that the first content item 802 will be the first item in the list, the second content item 804 will be the second item in the list, the third content item 806 will be the third item in the list, and so on. During an on-air presentation, the user 80 may navigate forward and backward through the on-air queue. FIG. 9 illustrates another view of the embodiment of the producer interface illustrated in FIG. 8, wherein the on-air queue has been reordered by the user 80. As illustrated in FIG. 9, the item that was previously the first content item 802 is now the second content item 904, and the item that was previously the second content item 804 is now the first content item 902.

The method 300 then proceeds to terminal D, and from terminal D (FIG. 3A) to a set of method steps 306 defined between a start terminal ("terminal E") and an exit terminal ("terminal F"), wherein broadcast-ready graphics for the content items in the on-air queue are generated and navigated while being inserted into the live video feed.

From terminal E (FIG. 3D), the method 300 proceeds to block 342, where the talent interface engine 210 receives a command via the producer interface to begin an on-air presentation. In some embodiments, the command to begin the on-air presentation could be as simple as a single tap or click on the "live" button in the upper right-hand corner. This is significant because that one tap or click initiates the remainder of the processing discussed below, thus making it seem to the user 80 as if the social content items are formatted and made broadcast-ready solely at their control with a single tap or click.

At block 344, the talent interface engine 210 generates a broadcast-ready on-air format for a content item from the on-air queue using one or more compliance rules. In some embodiments, the compliance rules are retrieved from the rule data store 212 based on a type associated with the content item. For example, a first compliance rule may be retrieved for a text-only tweet, while a second compliance rule may be retrieved for a tweet that includes text and an image, and a third compliance rule may be retrieved for an Instagram post. As discussed above, a compliance rule may include a format template, and data from the content item may be inserted into the format template in appropriate locations in order to generate the broadcast-ready on-air format. A broadcast-ready on-air format is typically of a high resolution, is legible even at a distance, has colors that are appropriate for inclusion in a video broadcast, and/or may otherwise be of high enough quality to be included in the produced video.

At block 346, a video generation engine 208 transmits the on-air format of the content item to a video production system 84. As discussed above, in some embodiments, the video generation engine 208 transmits a video stream from the mobile computing device 104 via a wireless network to a receiving device coupled to the video production system 84, and the receiving device may provide a high-definition video signal to the video production system 84. In some embodiments, other techniques may be used to transmit video to the video production system 84. In some embodiments, the video stream may include audio, particularly in cases where a social content item may include a video with sound.

At this point in the method 300, the video production system 84 combines the video stream received from the video generation engine 208 with a video stream from the video camera 82 in order to create the produced video. The video generation engine 208 may combine the video streams using any suitable technique known to one of ordinary skill in the art, including but not limited to compositing techniques (such as chromakey, lumakey, and/or the like), digital video effects, and/or any other suitable technique. Accordingly, the produced video includes the on-air format of the content item.

In some embodiments, the video generation engine 208 provides a video stream that is substantially the same as the on-air interface being presented to the user 80 on the mobile computing device 104. FIG. 10 illustrates an exemplary embodiment of an on-air interface presented to the user 80 after receiving the command to begin the on-air presentation from the producer interface illustrated in FIG. 9. The on-air interface 1002 presents the first item from the on-air queue, and the video generation engine 208 transmits a video stream that mirrors the on-air interface 1002 to the video production system 84.

Figure 12:
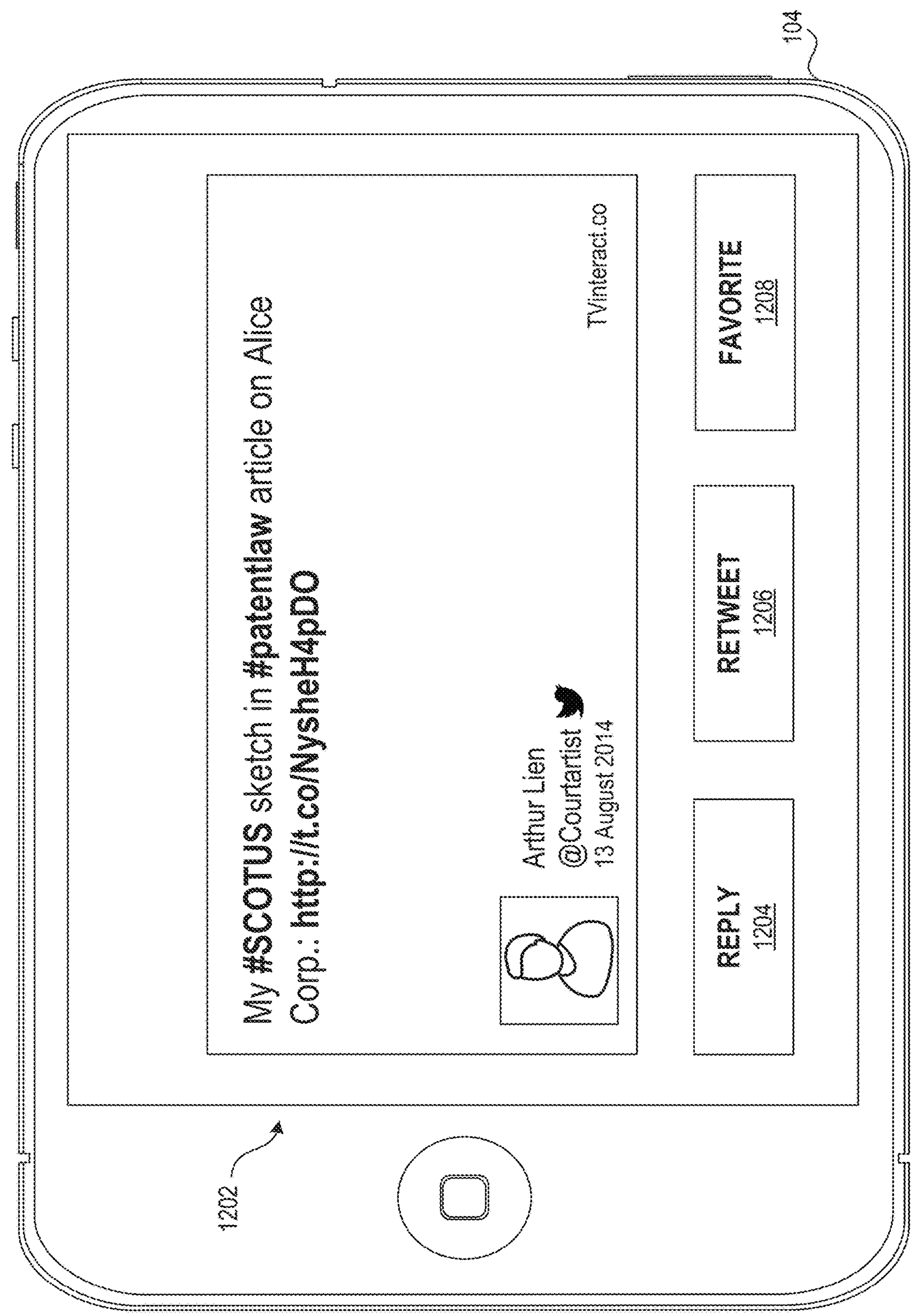
FIG. 12 illustrates an exemplary embodiment of an on-air interface presented to the user that includes additional interface elements according to various aspects of the present disclosure.

In some embodiments, the on-air interface presented by the mobile computing device 104 may include additional interface elements that are not included in the video stream provided by the video generation engine 208. These additional interface elements may allow the user 80 to perform tasks associated with the displayed content item. FIG. 12 illustrates an exemplary embodiment of an on-air interface presented to the user 80 that includes additional interface elements according to various aspects of the present disclosure. The on-air interface 1202 includes a reply button 1204, a retweet button 1206, and a favorite button 1208, thus allowing the user 80 to easily perform these actions while on the air. The video generation engine 208 omits the interface elements 1204, 1206, 1208 from the video signal transmitted to the video production system 84.

At block 348, the talent interface engine 210 receives a navigation command via the on-air interface presented on the mobile computing device 104. The navigation command may be selected from commands such as forward (to display the next item in the on-air queue), back (to display a previous item in the on-air queue), zoom-in (to display media associated with the social content item in a larger format), zoom out (to return from a display of associated media to a display of the social content item itself), play (to begin automatically navigating from one content item to the next content item), pause (to stop automatic navigation), and exit (to end the on-air display and return to the producer interface). The navigation command may be indicated a touch gesture that intuitively indicates the desired navigation. For example, forward may be indicated by a swipe in one direction, back may be indicated by a swipe in the opposite direction, zoom-in may be indicated by a tap on a portion of the graphic to zoom in on or a pinch-to-zoom gesture, zoom-out may likewise be indicated by a tap on a zoomed-in image or a pinch-to-zoom gesture, and/or the like. Some navigation gestures may be less intuitive in order to eliminate the chances that the gesture would be input or detected accidentally. For example, the gesture for exit may be an advanced or complicated gesture such as a triple tap in order to avoid inadvertently returning to the producer interface while on the air.

The method 300 then proceeds to optional block 350, where an author notification engine 206 transmits a notification to an author of the content item indicating that the content item was included in a produced video. The notification may be sent after receiving the navigation command, as opposed sending the notification after the social content item is included in an on-air graphic, in order to give the user 80 more control over when the notification is transmitted. In some embodiments, the author notification engine 206 may not transmit the notifications immediately, but may instead queue notifications for review and transmission after exiting on-air mode.

The method 300 then proceeds to a decision block 352, where a determination is made regarding whether the received navigation command was an exit command. If the result of the determination at decision block 352 is NO, then the method 300 returns to block 344, and blocks 344-350 are repeated for the next appropriate content item based on the received navigation command.

In some embodiments, the on-air interface presented by the talent interface engine 210 may include more than navigation functionality. For example, in some embodiments, the talent interface engine 210 may detect a gesture such as a tap-and-hold, long press, or other gesture distinguishable from the navigation gestures in order to enter an input mode. In the input mode, further gestures may be translated into drawing commands, and lines drawn by the user 80 in this mode may be added to the video stream in order to emphasize or otherwise refer to portions of the on-air graphic.

If the result of the determination at decision block 352 is YES, then the method 300 proceeds to block 354, where the video generation engine 208 stops transmitting on-air format graphics to the video production system 84. At this point, in some embodiments, the video stream from the video generation engine 208 to the video production system 84 stops, and the video production system 84 ceases using the video stream in the produced video. In some embodiments, the video stream may continue to be sent by the video generation engine 208, but it may only include a slate or the producer interface. In some embodiments, the video stream may be sent by the video generation engine 208 before, during, and after the method 300 as described, and the director may only choose to incorporate the video stream into the produced video when appropriate. This is similar to the use of other video sources in video production, such as video feeds from multiple cameras that are continually sent to the video production system 84 but that are not all used at the same time.

At block 356, the talent interface engine 210 returns to presenting the producer interface to the user 80, so that the user 80 may proceed to execute another query, rearrange the on-air queue, or otherwise repeat other portions of the method 300. From block 356, the method 300 proceeds to terminal F, and from terminal F (FIG. 3A) to an end block, where the method 300 terminates.

FIGS. 10 and 11 illustrate an exemplary embodiment of how a user 80 would navigate through the on-air queue illustrated in FIG. 9 according to various aspects of the present disclosure. In FIG. 10, the first content item 902 from the on-air queue is illustrated in the on-air interface 1002. Upon detecting a forward command (such as a swipe from right to left), the interface would transition from FIG. 10 to FIG. 11, where the on-air interface 1102 displays the second content item 904 from the on-air queue. At this point, a back command (such as a swipe from left to right) would cause the interface to transition back to the on-air interface 1002 illustrated in FIG. 10. The transitions from one interface to the next interface may use any suitable technique, such as an animation that sends the first interface out in the direction of the swipe and brings the second interface in from the direction of the swipe, a cut, a fade in/out, a dissolve, a wipe, a morph, or any other suitable technique.

Figure 14:
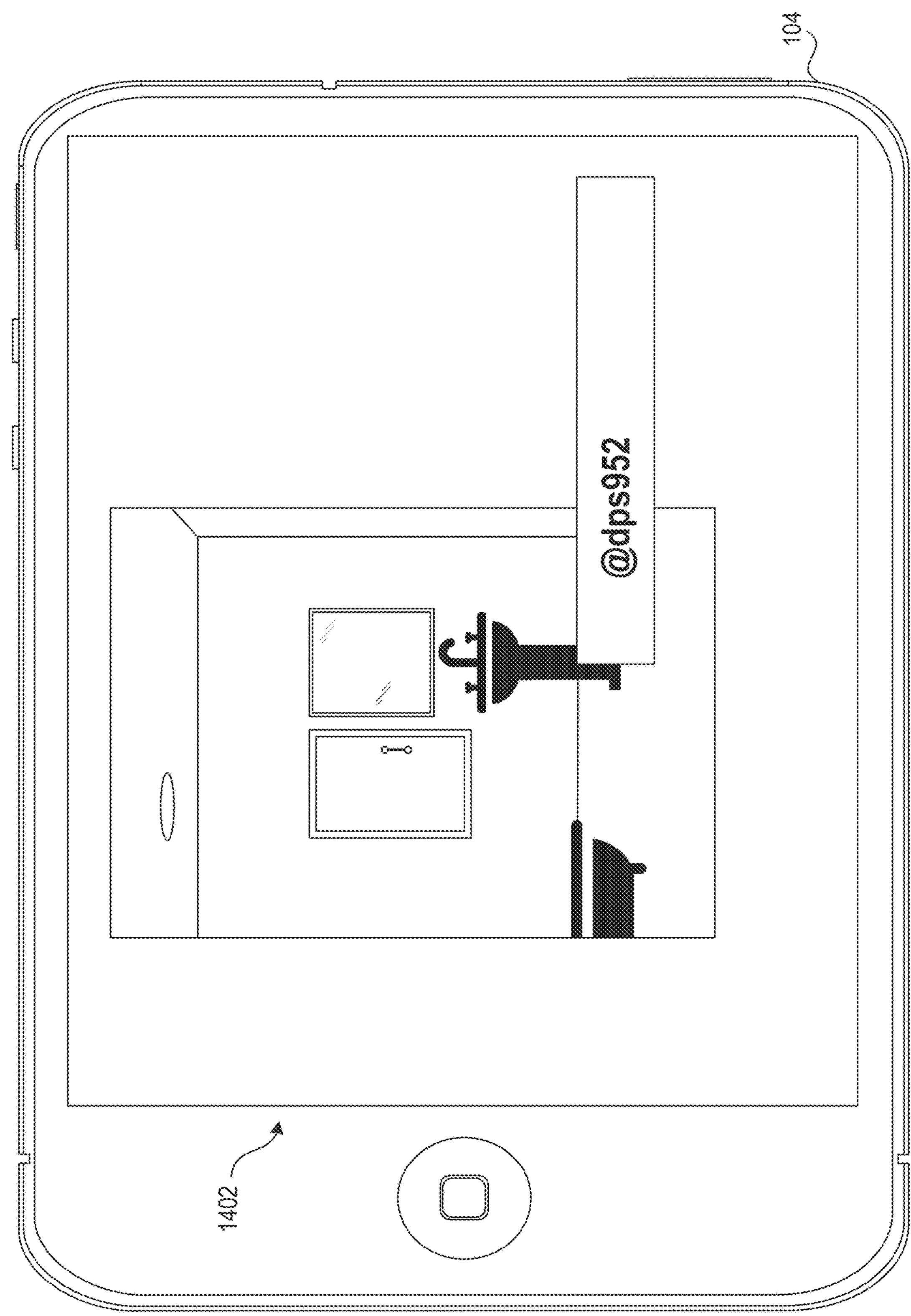

FIGS. 13 and 14 illustrate an exemplary embodiment of interfaces presented when a user zooms in to an image for a social content item that includes an image according to various aspects of the present disclosure. In FIG. 13, the on-air interface 1302 shows the body of a tweet 1304 and an image 1306 associated with the tweet. Upon receiving a zoom-in command (such as a tap, click, or pinch-to-zoom), the on-air interface transitions to the on-air interface 1402 illustrated in FIG. 14, wherein a larger version of the image is presented. Upon receiving a zoom-out command (such as a tap, click, or pinch-to-zoom), the on-air interface transitions back to the on-air interface 1302 illustrated in FIG. 13.

Figure 15:
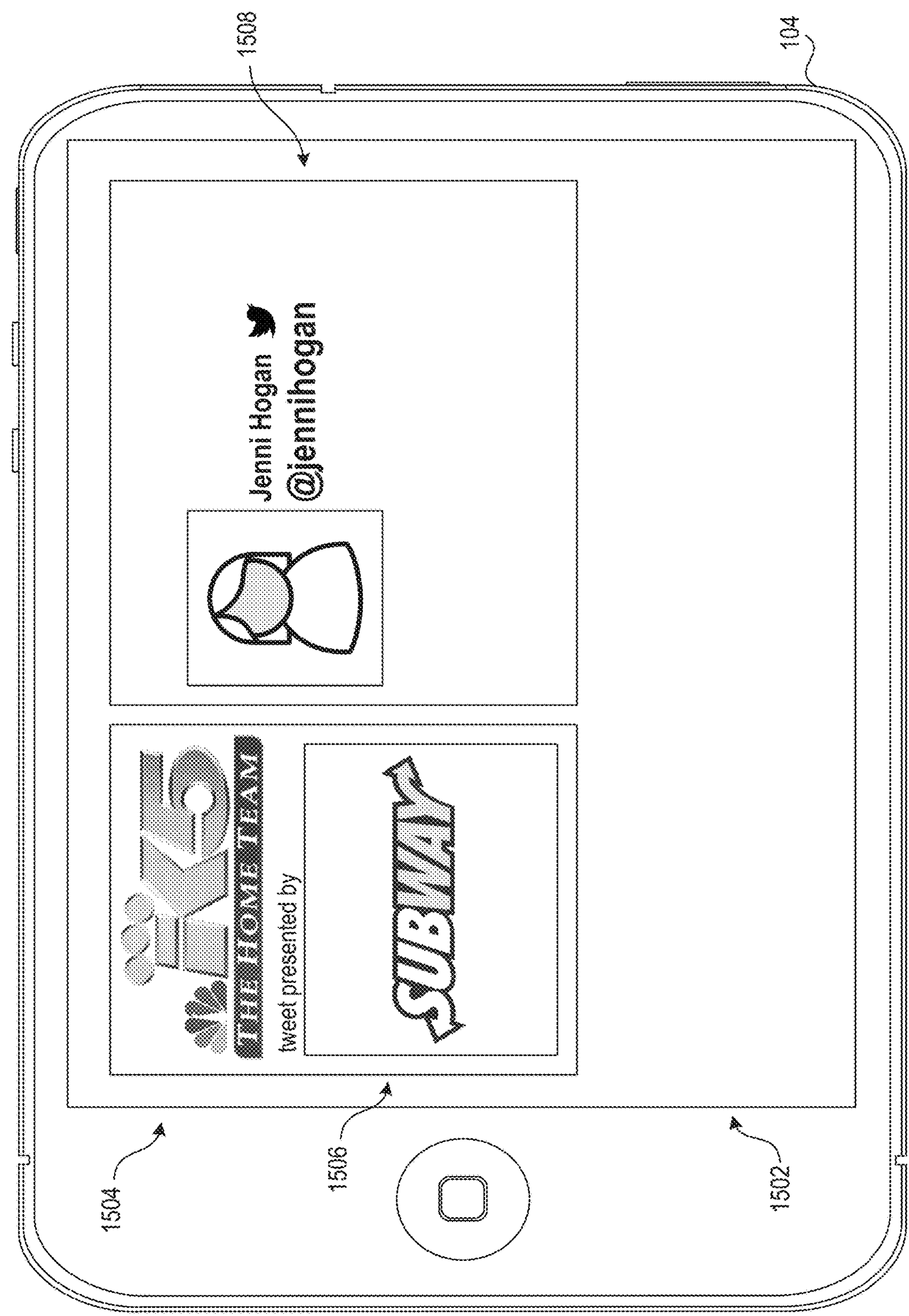
FIG. 15 illustrates an exemplary embodiment of an on-air interface that shows additional content according to various aspects of the present disclosure.

FIG. 15 illustrates an exemplary embodiment of an on-air interface 1502 that shows additional content according to various aspects of the present disclosure. As illustrated, a broadcaster logo 1504, an advertisement 1506, and an identification 1508 of the user 80 are all displayed. In some embodiments, the entire interface 1502 may be provided as a static image. In some embodiments, the layout of the interface 1502 may be specified similar to the specification of compliance rules, and some portions (such as the advertisement 1506 and the identification 1508 of the user 80) may be dynamically filled in by retrieving information from other portions of the system 100.

Figure 16:
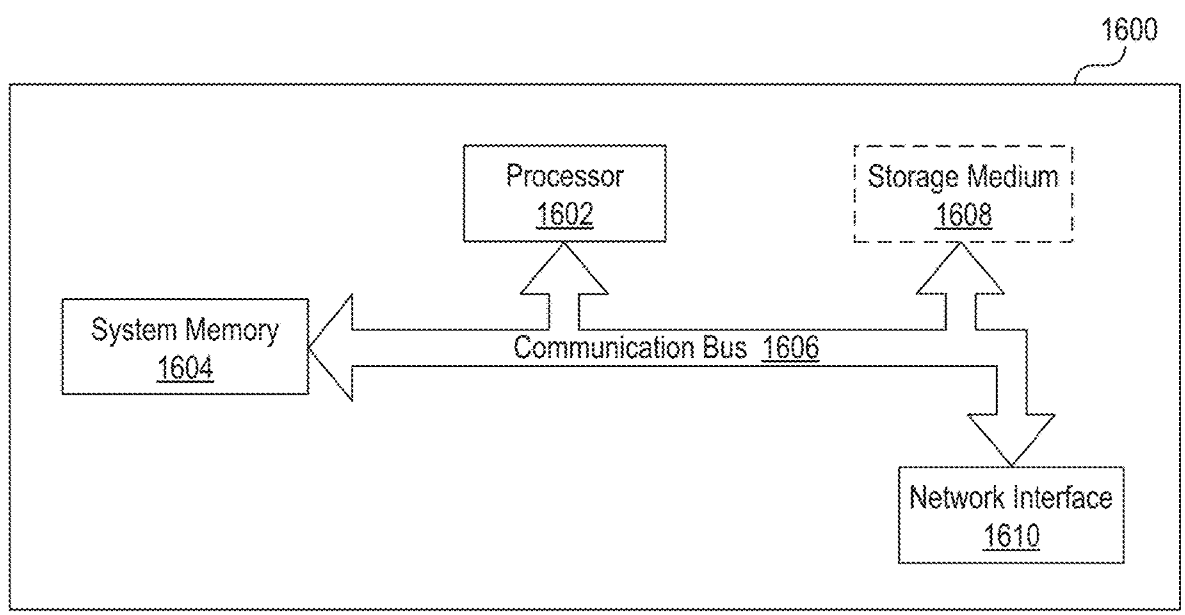
FIG. 16 is a block diagram that illustrates aspects of an exemplary computing device appropriate for use with embodiments of the present disclosure.

FIG. 16 is a block diagram that illustrates aspects of an exemplary computing device 1600 appropriate for use with embodiments of the present disclosure. While FIG. 16 is described with reference to a computing device that is implemented as a device on a network, the description below is applicable to servers, personal computers, mobile phones, smart phones, tablet computers, embedded computing devices, and other devices that may be used to implement portions of embodiments of the present disclosure. Moreover, those of ordinary skill in the art and others will recognize that the computing device 1600 may be any one of any number of currently available or yet to be developed devices.

In its most basic configuration, the computing device 1600 includes at least one processor 1602 and a system memory 1604 connected by a communication bus 1606. Depending on the exact configuration and type of device, the system memory 1604 may be volatile or nonvolatile memory, such as read only memory ("ROM"), random access memory ("RAM"), EEPROM, flash memory, or similar memory technology. Those of ordinary skill in the art and others will recognize that system memory 1604 typically stores data and/or program modules that are immediately accessible to and/or currently being operated on by the processor 1602. In this regard, the processor 1602 may serve as a computational center of the computing device 1600 by supporting the execution of instructions.

As further illustrated in FIG. 16, the computing device 1600 may include a network interface 1610 comprising one or more components for communicating with other devices over a network. Embodiments of the present disclosure may access basic services that utilize the network interface 1610 to perform communications using common network protocols. The network interface 1610 may also include a wireless network interface configured to communicate via one or more wireless communication protocols, such as WiFi, 2G, 3G, LTE, WiMAX, Bluetooth, and/or the like.

In the exemplary embodiment depicted in FIG. 16, the computing device 1600 also includes a storage medium 1608. However, services may be accessed using a computing device that does not include means for persisting data to a local storage medium. Therefore, the storage medium 1608 depicted in FIG. 16 is represented with a dashed line to indicate that the storage medium 1608 is optional. In any event, the storage medium 1608 may be volatile or nonvolatile, removable or nonremovable, implemented using any technology capable of storing information such as, but not limited to, a hard drive, solid state drive, CD ROM, DVD, or other disk storage, magnetic cassettes, magnetic tape, magnetic disk storage, and/or the like.

As used herein, the term "computer-readable medium" includes volatile and non-volatile and removable and non-removable media implemented in any method or technology capable of storing information, such as computer readable instructions, data structures, program modules, or other data. In this regard, the system memory 1604 and storage medium 1608 depicted in FIG. 16 are merely examples of computer-readable media.

Suitable implementations of computing devices that include a processor 1602, system memory 1604, communication bus 1606, storage medium 1608, and network interface 1610 are known and commercially available. For ease of illustration and because it is not important for an understanding of the claimed subject matter, FIG. 16 does not show some of the typical components of many computing devices. In this regard, the computing device 1600 may include input devices, such as a keyboard, keypad, mouse, microphone, touch input device, touch screen, tablet, and/or the like. Such input devices may be coupled to the computing device 1600 by wired or wireless connections including RF, infrared, serial, parallel, Bluetooth, USB, or other suitable connections protocols using wireless or physical connections. Similarly, the computing device 1600 may also include output devices such as a display, speakers, printer, etc. Since these devices are well known in the art, they are not illustrated or described further herein.

As will be appreciated by one skilled in the art, the specific routines described above in the flowcharts may represent one or more of any number of processing strategies such as event-driven, interrupt-driven, multi-tasking, multi-threading, and the like. As such, various acts or functions illustrated may be performed in the sequence illustrated, in parallel, or in some cases omitted. Likewise, the order of processing is not necessarily required to achieve the features and advantages, but is provided for ease of illustration and description. Although not explicitly illustrated, one or more of the illustrated acts or functions may be repeatedly performed depending on the particular strategy being used. Further, these FIGURES may graphically represent code to be programmed into a computer readable storage medium associated with a computing device.

While illustrative embodiments have been illustrated and described, it will be appreciated that various changes can be made therein without departing from the spirit and scope of the invention.

The invention claimed is:

1. A method of providing graphics content for inclusion in a produced video, the method comprising:

retrieving, by a mobile computing device, a set of social content items from a social media platform;

receiving, by the mobile computing device, a selection of one or more social content items from the set of social content items for inclusion in an on-air queue;

generating, by the mobile computing device, an on-air format graphic for each content item in the on-air queue; and transmitting, by the mobile computing device, a display signal including the on-air format graphics to be included in the produced video.

2. The method of claim 1, wherein transmitting the display signal including the on-air format graphics comprises:

transmitting, by the mobile computing device, a display signal including an on-air format graphic associated with a content item in the on-air queue;

receiving, by the mobile computing device from a user, a navigation command to move from the content item in the on-air queue to a different content item in the on-air queue; and transmitting, by the mobile computing device, a display signal including an on-air format graphic associated with the different content item in the on-air queue.

3. The method of claim 2, wherein the produced video is a live video of the user providing the navigation command.

4. The method of claim 2, wherein the navigation command is selected from the group consisting of a forward command, a back command, a zoom-in command, a zoom-out command, a play command, and a stop command.

5. The method of claim 1, wherein the produced video is a broadcast television video or a live streaming video.

6. The method of claim 1, wherein retrieving the set of social content items from the social media platform includes:

receiving, by the mobile computing device, a set of query parameters; and transmitting, by the mobile computing device to the social media platform, a query based on the set of query parameters.

7. The method of claim 6, wherein retrieving the set of social content items from the social media platform further includes applying, by the mobile computing device, one or more compliance rules to a set of social content items received from the social media platform.

8. The method of claim 1, further comprising ceasing transmission of the display signal that includes on-air format graphics upon detection of a complex gesture by a user.

9. The method of claim 8, wherein the complex gesture is a triple-tap.

10. A system for displaying and navigating social content item graphics in a produced video, the system comprising:

a talent interface engine configured to receive navigation commands from a user for navigating an on-air queue of social content items; and a video generation engine configured to:

create on-air format graphics based on the content items in the on-air queue of content items; and generate a video graphic signal that includes the on-air format graphics;

at least one video camera configured to generate a live video signal; and a video production system configured to combine the live video signal from the at least one video camera and the video graphic signal from the mobile computing device to generate the produced video.

11. The system of claim 10, wherein the live video signal generated by the video camera includes a live image of the user from whom navigation commands are received.

12. The system of claim 10, further comprising a content collection engine configured to:

receive a set of query parameters from the user;

transmit a query based on the set of query parameters to a social media platform; and receive a set of social content items from the social media platform.

13. The system of claim 12, wherein the talent interface engine, the content collection engine, and the video generation engine are provided by a mobile computing device.

14. The system of claim 12, wherein the talent interface engine is provided by a mobile computing device, and at least one of the content collection engine and the video generation engine is provided by a computing device other than the mobile computing device.

15. The system of claim 12, wherein the talent interface engine is further configured to:

present the received set of social content items to the user; and receive a selection of one or more social content items from the presented set of social content items for inclusion in the on-air queue.

16. The system of claim 10, wherein the video production system is configured to combine the live video signal and the video graphic signal using digital video effects or compositing.

17. The system of claim 10, further comprising an author notification engine configured to transmit a notification to an author of a given social content item once the given social content item is included in the produced video.

18. A nontransitory computer-readable medium having computer-executable instructions stored thereon that, in response to execution by one or more processors of a mobile computing device, cause the mobile computing device to perform actions for providing graphics content for inclusion in a produced video, the actions comprising:

retrieving, by the mobile computing device, a set of social content items from a social media platform;

receiving, by the mobile computing device, a selection of one or more social content items from the set of social content items for inclusion in an on-air queue;

generating, by the mobile computing device, an on-air format graphic for each content item in the on-air queue; and transmitting, by the mobile computing device, a display signal including the on-air format graphics to be included in the produced video.

19. The computer-readable medium of claim 18, wherein transmitting the display signal including the on-air format graphics comprises:

transmitting, by the mobile computing device, a display signal including an on-air format graphic associated with a content item in the on-air queue;

receiving, by the mobile computing device from a user, a navigation command to move from the content item in the on-air queue to a different content item in the on-air queue; and transmitting, by the mobile computing device, a display signal including an on-air format graphic associated with the different content item in the on-air queue.

20. The computer-readable medium of claim 18, wherein retrieving the set of social content items from the social media platform includes:

receiving, by the mobile computing device, a set of query parameters; and transmitting, by the mobile computing device to the social media platform, a query based on the set of query parameters.

* * * * *